(12) United States Patent
Crandall et al.

(10) Patent No.: US 11,485,425 B2
(45) Date of Patent: Nov. 1, 2022

(54) MODULAR SYSTEMS FOR USE WITH VEHICLES, FOR MOUNTING ACCESSORIES AND RELATED METHODS

(71) Applicant: Cord Group LLC, Placentia, CA (US)

(72) Inventors: Robert Crandall, Yorba Linda, CA (US); William H. Cord, Corona Del Mar, CA (US)

(73) Assignee: Cord Group LLC, Placentia, CA (US)

( * ) Notice: Subject to any disclaimer, the term of this patent is extended or adjusted under 35 U.S.C. 154(b) by 277 days.

(21) Appl. No.: 16/694,938

(22) Filed: Nov. 25, 2019

(65) Prior Publication Data

US 2020/0102024 A1    Apr. 2, 2020

Related U.S. Application Data

(62) Division of application No. 15/792,578, filed on Oct. 24, 2017, now Pat. No. 10,507,874.

(60) Provisional application No. 62/447,072, filed on Jan. 17, 2017, provisional application No. 62/411,967, filed on Oct. 24, 2016.

(51) Int. Cl.
| | | |
|---|---|---|
| *B62D 33/02* | (2006.01) | |
| *B60R 9/06* | (2006.01) | |
| *B60R 9/02* | (2006.01) | |
| *B60R 9/045* | (2006.01) | |

(52) U.S. Cl.
CPC ............ *B62D 33/0207* (2013.01); *B60R 9/02* (2013.01); *B60R 9/045* (2013.01); *B60R 9/06* (2013.01); *B62D 33/0222* (2013.01)

(58) Field of Classification Search
CPC ......... B60P 7/0815; B60R 9/04; B60R 9/045; B60R 9/06; B60R 9/08; B62D 33/0207; B62D 33/0222

USPC .......................................................... 296/3
See application file for complete search history.

(56) References Cited

U.S. PATENT DOCUMENTS

| | | | | |
|---|---|---|---|---|
| 5,061,000 A | * | 10/1991 | Haugen | B60P 3/42 296/3 |
| 5,143,415 A | * | 9/1992 | Boudah | B60R 9/00 224/325 |
| 5,393,114 A | | 2/1995 | Christensen | |
| 6,513,849 B2 | * | 2/2003 | Carter | B60P 3/40 224/310 |
| 6,883,848 B1 | * | 4/2005 | Iverson | B62D 33/044 280/756 |
| 7,946,457 B2 | * | 5/2011 | Kramer | B60R 9/00 224/405 |
| 10,160,371 B2 | | 12/2018 | Frost | |
| 2007/0176447 A1 | * | 8/2007 | Storer | B60R 13/005 296/3 |
| 2008/0100075 A1 | | 5/2008 | Derecktor | |

(Continued)

OTHER PUBLICATIONS

Non-Final Office Action on co-pending U.S. Appl. No. 15/792,578 dated Jun. 13, 2019.

*Primary Examiner* — Jason S Daniels
(74) *Attorney, Agent, or Firm* — Klein, O'Neill & Singh, LLP

(57) ABSTRACT

A modular support system for a vehicle with multi-component support structures that include a pair of side supports, a pair of base supports, and a horizontal support suspended between the pair of side supports. Each side support can include a vertical portion, a base portion extending from the vertical portion and coupled, directly or indirectly, to the base support.

17 Claims, 18 Drawing Sheets

(56) References Cited

U.S. PATENT DOCUMENTS

| | | |
|---|---|---|
| 2010/0072237 A1 | 3/2010 | Green |
| 2010/0308091 A1* | 12/2010 | Hubbard .................. B60R 9/05 |
| | | 224/316 |
| 2014/0197653 A1* | 7/2014 | Stepanians ............... B60P 3/40 |
| | | 296/3 |
| 2015/0197202 A1 | 7/2015 | Harrison |
| 2017/0166105 A1 | 6/2017 | Puchkoff |

* cited by examiner

MODULAR SYSTEMS FOR USE WITH VEHICLES, FOR MOUNTING ACCESSORIES AND RELATED METHODS

CROSS-REFERENCE TO RELATED APPLICATIONS

This application relates to and claims the benefit of U.S. Provisional Application No. 62/411,967 filed Oct. 24, 2016, the contents of which are expressly incorporated herein by reference.

BACKGROUND

The field of the invention relates to accessories for vehicles and more particularly to modular systems and methods for mounting accessories onto a vehicle.

Vehicles are often sold without or with minimal options for attaching accessories. For example, pickup trucks may have a rear bed area with tie down locations but are not adequate beyond simple use and fail to fulfill personal requirements held by some pickup truck owners. These needs can vary depending on the occasions, such as for camping, hauling, or traveling.

Various solutions have been created to address the problem of accessory mounting for vehicles, including basic track systems. However, existing solutions have many drawbacks including limits in the number of accessories that can be mounted, or lacking a modular design which enables the vehicle owner to modify the accessory mounting system to achieve a different look or function.

SUMMARY

Accessory mounting systems, such as modular rack systems or modular support systems having multi-component support structures, disclosed herein may be installed onto vehicles using stake bed pocket attachments and/or mounting brackets. Accessory mounting systems of the present disclosure, such as bed rail systems, have a modular construction which can be packaged in one or more conventional shipping boxes, delivered to just about anywhere via shipping freight, adjusted to size for the particular vehicle, and quickly assembled onto the vehicle.

Aspects of the present disclosure share similar features as the modular systems disclosed in pending U.S. application Publication No. US2016/0090048, Ser. No. 14/866,520, filed Sep. 25, 2015, the contents of which are expressly incorporated herein by reference. The '048 publication discloses, among other things, modular systems comprising a base support, a side support, and a horizontal support. In a particular embodiment, the disclosed modular system comprises two side supports, two base supports, and a horizontal or center support. As further discussed below, the modular systems and components of the present disclosure use the same concept and features as the systems and components disclosed in the '048 publication but with added functionalities and features not previously contemplated to create a more robust and dynamic modular support system.

Aspects of the present disclosure include a modular support system for use with a bed of a pickup truck for mounting accessories to a vehicle. An exemplary modular system can comprise a multi-component support structure with one or more attachments that can be removably attached to the support structure. The multi-component support structure can attach to the back of a pickup truck. The multi-component support structure, which can be a modular bed rail system with adjustability for different pickup truck sizes, can comprise a pair of side supports and a pair of base supports coupled, directly or indirectly, together and to the vehicle. Each side support can comprise a vertical portion, a base portion extending from the vertical portion, and an optional gusset plate interconnecting the vertical portion with the base portion.

The vertical portion and the base portion can form an angle therebetween. The optional gusset plate can be welded to the side support or bolted to the side support, such as to the base portion and the vertical portion. Each base support can be coupled to the base portion of the side support, which together define a bed length support.

Opposite ends of a horizontal support or center support structure can be suspended between the side supports, such as joiners. For example, the horizontal support can be connected at its two ends to the two side supports, thereby suspended in the center between the two side supports.

In an example, the horizontal support or center support structure can be adjusted relative to a support post coupling, otherwise called center support joiner, located at each side support. This allows the horizontal support to be manufactured and supplied with a longer overall length than necessary to mount to a bed of a pickup truck. In other words, the center support can be supplied with a first length, cut down to a shorter second length, and then secured at its two ends to the two support post couplings with the second length, which is shorter than the original first length.

One or both ends of the horizontal or center support can be covered with a cap, which can be mechanically fastened to the respective end of the center support. Alternatively, an end cover can be welded to each respective end of the horizontal support.

In an example, the horizontal support can have a non-circular shape. For example, the horizontal support can have a polygonal shaped cross-section or an irregular shaped cross-section. In some examples, the horizontal support can have a cross-section having an airfoil shape having a leading edge with a greater height or thickness than a trailing edge. When mounted to a vehicle, the leading edge is to be located upstream of the trailing edge.

A fastener slot can extend along a length of the horizontal support to accommodate one or more attachments, such as one or more light housings, handles, etc. The fastener slot can be an anchor bolt slot, a hex bolt slot, a nut slot, or a slot sized and shaped to permit one or more mechanical fasteners, such as threaded fasteners, to mount thereto. In some examples, two or more spaced apart fastener slots can be provided with the horizontal support. A fastener slot can be referred to as a bolt galley.

One or more clamping attachments can be configured to clamp the modular support structure to the vehicle. Alternatively or additionally, attachment inserts can be used to mount the modular support system of the present disclosure to corresponding stake pockets.

The horizontal support, one or both side supports, and one or both base supports of the present modular system can include one or more channels or paths for routing wires, connectors, cables, tube sections, and the like, within the wall or body of the various components to hide the various run lines.

The present disclosure can further include a plurality of stake inserts each comprising an anchor portion configured to be received in a stake pocket of a vehicle. A connecting portion can be configured to engage a surface of the base support or the side support to then anchor the base support or the side support to the vehicle. A mounting plate can be provided to restrict the depth of the anchor portion in the stake pocket. Other mechanical means can be provided to permit secured attachment of the modular system to the vehicle.

The anchor portion of each stake insert can be a long rectangular block having a size substantially equal to or slightly less than a size of the stake pocket.

The rectangular block of an anchor portion can have a rubber coating.

The anchor portion can be fixed by a clamping force.

An attachment device for use with the modular support system of the present disclosure can have a left side bracket, a right side bracket, and a module coupled between the left side bracket and the right side bracket. The left side bracket and the right side bracket can be coupled to the horizontal support.

The module can be a platform configured to support weight bearing against the platform.

Loops or hooks can extend outwardly from the left and right side brackets to provide securing locations for a securing mechanism to extend over and secure items resting against the platform.

The module can be a light bar pivotably coupled to the left side bracket and the right side bracket or other support elements of the modular system. A light bar, a strip of light, or individual lights can attach to the horizontal support, typically above the roof line of a truck cab.

The attachment for use with the modular system of the present disclosure can be one or more cross members extending between the base supports and slidably fixable along tracks defined in a surface of each of the base supports.

Track mounts can be provided on opposite ends of the cross members to engage and slide along the tracks of the base supports.

A locking feature can lock a track mount at a desired location along a base support.

One or more accessory mounts can be fixed along the cross member. The mount can be a bicycle mount. The mount can support other objects, such as a cooler, a spare gasoline tank, or a spare tire.

The attachment can be a tire mount coupled to a bar support.

The tire mount can comprise a tire support flange coupled to a pair of support hooks by an intermediate extension member, and a locking mechanism to prevent the tire mount from unintended movement or release.

A handle can be coupled to the base support to form a grip for a user to provide access to the vehicle. One or more handles can be provided on each base support.

A light strip can be coupled directly to the multi-component support structure. Alternatively or in addition thereto, multiple individually housed light elements can be mounted to the modular support system, such as to the horizontal support.

A further aspect of the present disclosure includes a method of manufacturing a modular support system for a vehicle, which can be a modular bed rail system for use with a pickup truck having a truck bed. The method can comprise forming a multi-component support structure comprising: providing a pair of side supports, each side support comprising a vertical portion, a base portion extending from the vertical portion, and a gusset plate interconnecting the vertical portion with the base portion, the vertical portion and the base portion forming an angle therebetween, coupling a pair of base supports to the base portions of the side supports, and suspending a horizontal support between the vertical portions. In some examples, the horizontal support or center support can be connected at each of its end to a center support joiner. The horizontal support can have a polygonal shaped cross-section or an irregular shaped cross-section. In some examples, the horizontal support can have a cross-section having an airfoil shape having a leading edge with a greater height or thickness than a trailing edge.

The various elongated extruded elements of the present disclosure can have any number of non-circular cross-sections, such as oval, polygonal, irregular, and as shown in the various figures.

An attachment device for attaching to the modular system can be at least one of a cross member extending between the base supports, a tire mount coupled to one base support, a light strip coupled directly to the support structure, a light bar coupled to the horizontal support, one or more housed light elements coupled to the horizontal support, and a platform coupled to the horizontal support.

A still further aspect of the present disclosure includes a modular system for mounting on a vehicle, the modular system can comprise a multi-component support structure having a width and a length and comprising: two side supports, each side support comprising a vertical portion, a lower base portion extending from the vertical portion, and a gusset plate interconnecting the vertical portion with the lower base portion; two base supports respectively removably coupled to the lower base portions; a horizontal support removably attached to a support post coupling located at each end of the two side supports; and wherein the horizontal support has a cross-sectional profile of an airfoil. The horizontal support with the airfoil cross-section can change length from a first length to a second length, which is shorter than the first length. The length can be shortened using a cutting device, such as a miter saw, a hex saw, or similar cutting instruments.

Each side support can comprise two telescoping elements to enable adjustment to the height of the respective side support to fit or match the size, such as the height, of the cab of a pickup truck.

The modular system can further comprise an attachment device configured to clamp the support structure to a vehicle.

The modular system can further comprise a plurality of stake inserts, each stake insert can comprise an anchor portion configured to be received in a stake pocket of a vehicle, a connecting portion configured to engage a surface of the base support or side support, and a mounting plate configured to restrict the depth of the anchor portion in a stake pocket.

The modular system wherein the anchor portion can be a long rectangular block having a size substantially equal to or slightly less than a size of a stake pocket.

The modular system wherein both the horizontal support and the second set of two base supports can be interchangeable to produce both a different width and a different length. In some examples, the different width can be changed or modified by cutting the horizontal support from a first length down to a shorter second length. The cutting can be performed using a household miter saw, a hex saw, or other cutting instruments, such as an angle or straight grinder with an appropriate cutting surface.

The modular system can further comprise a T-slot or bolt galley on a side of at least one of the base supports.

The modular system wherein the attachment can include a left side bracket, a right side bracket, and a module coupled between the left side bracket and the right side bracket.

The modular system wherein the module can be a platform configured to support a surface bearing against the platform.

The modular system wherein loops or hooks can extend outwardly from the left and right side brackets to provide securing locations for a securing mechanism to extend over and secure the surface against the platform.

The modular system wherein the module can be a light bar pivotably coupled to the left side bracket and the right side bracket.

The modular system wherein the attachment can be one or more cross members extending between the two base supports that can be slidably fixed along tracks defined in a surface of each of the two base supports.

The modular system wherein a track mount can be provided on each of two opposite ends of each cross member to engage and slide along the tracks of the base supports.

The modular system wherein a locking feature can be provided with each track mount to lock the track mount at a desired location.

The modular system wherein one or more accessory mounts can be fixed along the cross member.

The modular system wherein the attachment can be a tire mount coupled to a bar support.

The modular system wherein the tire mount can comprise a tire support flange coupled to a pair of support hooks by an intermediate extension member, and a locking mechanism can prevent the tire mount from unintended movement or release.

The modular system wherein a handle can be coupled to one of the base supports and to provide a gripping surface for a user to provide access to a vehicle.

The modular system wherein a light strip can be coupled directly to the multi-component support structure.

The modular system wherein the left side bracket and the right side bracket can be coupled to the horizontal support.

A still yet further aspect of the present disclosure is a modular support system for mounting on a bed of a vehicle comprising: a first side support and a second side support, each side support comprising a vertical portion, a lower base portion extending from the vertical portion, and a center support joiner comprising an internal cavity having a non-circular shape along an end cross-section; a first bar extension having a first free end and a second free end, said first free end projects into the internal cavity of the center support joiner of the first side support and the second free end having a coupling support mounted thereon; a second bar extension having a first free end and a second free end, said first free end projects into the internal cavity of the center support joiner of the second side support and the second free end having a coupling support mounted thereon; a center support directly or indirectly attached to the two coupling supports located on the first and second bar extensions.

Another aspect of the present disclosure includes a method of manufacturing a modular system for a vehicle. The method can comprise: providing two side supports, each side support comprising a vertical portion, a lower base portion extending from the vertical portion, and an optional gusset plate interconnecting the vertical portion with the base portion; coupling two base supports to corresponding lower base portions of the two side supports; removably coupling a horizontal support between the two side supports; the two side supports, the two base supports, and the horizontal support forming a multi-component support structure having a length and a width. The method can further comprise removably coupling an attachment to the support structure and providing removable connections for replacing the two base supports with a second set of two base supports. The length of the horizontal support can be adjusted from a first length to a shorter second length.

Optionally, provisions can be provided to adjust the horizontal support and to replace the two base supports with a second set of two base supports.

The method wherein the attachment can be at least one of a cross member extending between the base supports, a tire mount coupled to one base support, a light strip coupled directly to the support structure, a light bar coupled to the horizontal support, and a platform coupled to the horizontal support.

A further aspect of the present disclosure includes one or more packages having components for assembling a modular support structure enclosed therein. The components can be assembled and mounted on a vehicle, such as a bed of a pickup truck. The assembling step can include a cutting step, such as cutting the length of a horizontal support from a first length to a shorter second length.

The assembling step can further comprise adjusting a height of a side support by telescoping two elongated tube sections relative to one another.

The assembling step can further comprise adjusting an angle of an airfoil.

The assembling step can further comprise mounting one or more light housings to the horizontal support member. The mounting of the one or more light housings can be on the upper surface of the airfoil.

Two or more light housings can be spaced from one another by moving each light housing within a fastener slot incorporated with the horizontal support.

The assembling step can comprise projecting the horizontal support through two support post couplings, one at each end of a side support.

Method of making and of using modular support structures and components thereof are within the scope of the present disclosure.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of vehicular modular systems and accessories for use with the modular systems provided in accordance with aspects of the present devices, systems, and methods, and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
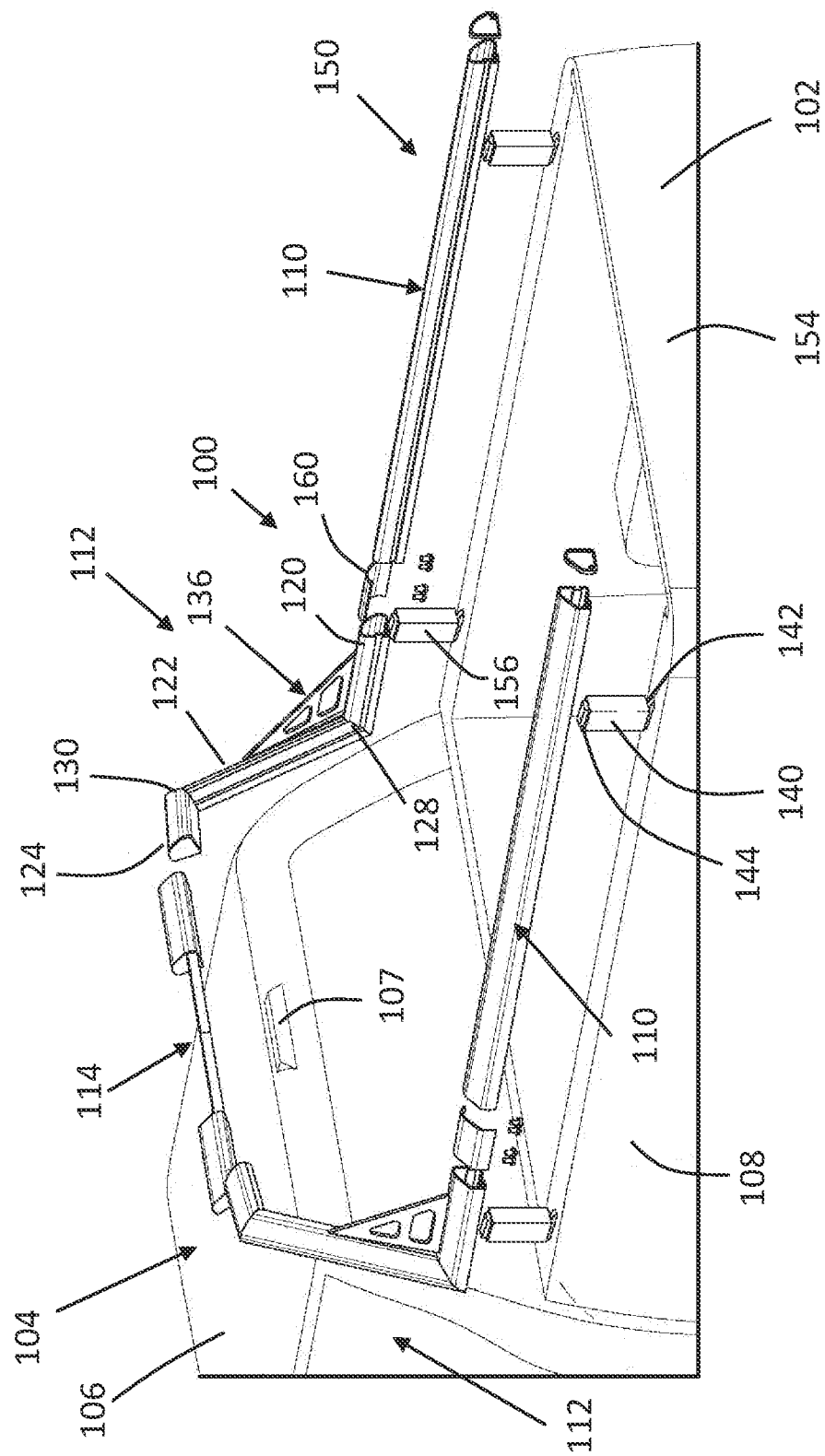
FIG. 1 is a schematic partial exploded view of a modular support system mounted on a bed of a pickup truck.

With reference now to FIG. 1, a modular support system 100 in accordance with aspects of the present disclosure is shown mounted on a bed 102 of a vehicle 104, such as a pickup truck. The modular system 100 is similar to the modular systems disclosed in US Publication No. US2016/0090048, previously incorporated by reference, with a few exceptions. As shown, the modular system 100 comprises two base supports 110, two side supports 112, and a center support 114 located between the two side supports 112. In some examples, the center support 114 can embody two or more pieces or components. Each side support 112 can comprise a lower base portion 120 connected to a vertical portion 122, which is connected to an upper base portion 124.

With particular reference to one of the two side supports 112, which can both be the same but reversed to match different ends of a cab 106 or different corners of the pickup bed 102, the lower base portion 120 can be welded to the vertical portion 122 along a lower weld joint 128. The vertical portion 122 can be welded to the upper base portion 124 along an upper weld joint 130. The three welded portions and the two weld joints can be adjusted to have any number of angles to conform the attached components to any desired vehicles or cabs before welding them. As shown, the lower base portion 120 is roughly orthogonal to the vertical portion 122 along a plane. Similarly, the upper base portion 124 is roughly orthogonal to the vertical portion 122 along another plane. Again, the particular angles between the three components 120, 122, 124 of the side support 112 can vary to conform to any desired cab of any desired vehicle. In an example, a pre-selected configuration can be implemented that closely matches most commercially available cabs and the sections can be permanently welded along the two weld joints to minimize the need for customization of the angles between the vertical portion and the upper portion and the vertical portion and the loser portion while still provide an appropriate it. In the installed configuration on a bed of a pickup or when the modular system is assembled, the vertical portion 122 is not true vertical relative to the ground but tilts in the direction of the center of the cab, near the cab's third break light 107. In some examples, the vertical portion 122 can be generally vertical relative to the ground.

A gusset plate 136 can optionally be provided between the lower base portion 120 and the vertical portion 122 to support and add strength to the side support 112. As further discussed below, the gusset plate 136 can be welded to the side support 112 or fastened to the side support, such as with threaded fasteners. However, the lower joint 128 can be sufficiently rigid so that the gusset plate 136 can be omitted, such as by selecting the appropriate welds, material thickness, material selection, other supports at other locations of the side support, etc.

In an example, the lower base portion 120, the vertical portion 122, and the upper base portion 124 can each be made or formed from an elongated rigid structural element capable of providing support, such as to hang or attach items to or therewith. In an example, each elongated rigid structural element can be an extruded aluminum element having an outer contour that can be other than round, such as polygonal, oval, elliptical, irregular, or combinations thereof. The extruded aluminum element can also include one or more internal ribs or tabs for reinforcement, T-slots, also called bolt slots or bolt galleys, for securing items or things to the elongated rigid structural element using nuts, bolts, and/or screws that engage the T-slots.

Also shown in FIG. 1 is a plurality of stake bed attachment inserts 140 for attaching to the plurality of stake pockets 142 provided on the side panels 108 of the bed 102. The modular system 100 can attach to the plurality of stake bed attachment inserts 140 to then secure the modular system to the bed 102 of the vehicle 104. In an example, each attachment insert 140 can include a tongue or tab 144 for attaching to a groove or slot, such as a bolt galley, on the base support 110 and/or the lower base portion 120 to hold the modular system 100 to the bed 102. In other examples, clamps, anchors, or the likes can be used to secure the modular system 100 to the bed 102 of the vehicle, as further discussed below.

Each base support 110 and each lower base portion 120 of a side support 112 can define a bed length support 150 that extends from near the cab 106 to the opposite end of the bed 102 of a vehicle 104, near the tail gate 154. In an example, each bed length support 150 can be secured to the bed 102 using only two attachment inserts 140 or two clamps, as further discussed below. The attachment inserts and/or the clamps for securing the bed length support 150 to the bed may individually be referred to as a hold down member 156 or collectively as hold down members 156. As shown, the base support 110 of the bed length support 150 can be secured to the bed with one hold down member 156 and the lower base portion 120 of the bed length support 150 can be secured to the bed with another hold down member 156.

The interface between lower base portion 120 and the base support 110 can be tied or connected by a joiner sleeve 160, which can act as a coupling to join the two ends of the lower base portion 120 and the base support 110 together, such as by securing the joiner sleeve 160 to the bolt galley or T-slot on each of the two support members, as further discussed below. In some examples, the base support 110 of the bed length support 150 can be secured to the bed with two hold down members 156, one at or near each end of the elongated rigid structural element of the base support while the lower base portion 120 of the bed length support 150 can be secured to the bed with another hold down member 156. A joiner sleeve 160 can be used to cover the interface between lower base portion 120 and the base support 110.

Figure 2:
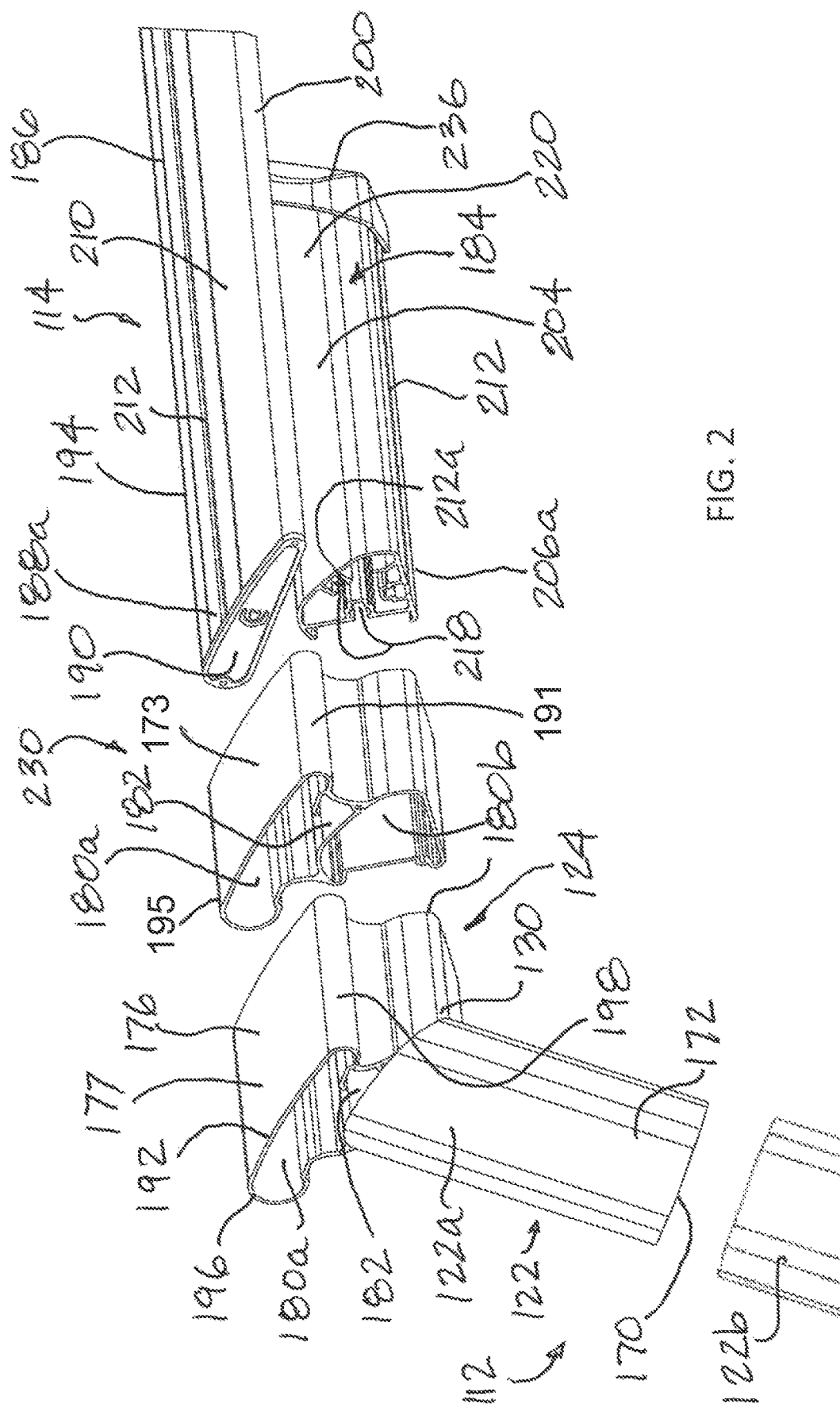
FIG. 2 is a schematic partial exploded view of a part of a side support of the present disclosure and part of a center support structure.

With reference now to FIG. 2, a partial exploded view of a side support 112 and a center support 114 in accordance with aspects of the present disclosure is shown. As shown, the side support 112 has vertical support 122 that in the present embodiment comprises a first or upper vertical portion 122a and a second or lower vertical portion 122b. In one example, the first and the second vertical portions 122a, 122b are telescopically arranged so that the overall height or length of the vertical support 122 can be adjusted by changing the extent of telescope between the first and second vertical portions 122a, 122b. For example, the first or upper vertical support 122a can have a similar body contour as the second or lower vertical support 122b but slightly larger so as to receive the second vertical support 122b inside the interior 170 of the wall structure or body 172 of the first vertical portion 122a. In some examples, this arrangement can be reversed. By incorporating a telescoping arrangement, the first and second vertical portions 122a, 122b can collapse or extend like a collapsible antenna to adjust the overall length of the vertical portion 122.

In an example, the lengths of the first and second vertical portions 122a, 122b can be selected to give a range of telescoping adjustment, such as between about 4-10 inches. This in turn will allow the overall height or length of the vertical portion 122 to vary for use with different cabin height sizes of from about 4 inches up to about 10 inches in cabin height differences. In other examples, the telescoping adjustment can vary a greater range, such as from about zero up to about 24 inches, or as desired by selecting the appropriate lengths, and anywhere in between. Once the telescoping adjustment is made between the first and second vertical supports 122a, 122b to fit a particular cab size, such as a particular cab with a known height, the two supports 122a, 122b can be tied down, locked down, or otherwise secured to fix from telescoping. For example, one or more fasteners, such as a screw, hold-down bolts, or a nut/bolt combination, can be used to fix the two supports from telescoping, as further discussed below.

Although not shown in FIG. 2, the second or lower vertical portion 122b is connected to a lower base portion 120 (FIG. 1). A gusset plate 136 can optionally be incorporated to further support or strengthen the lower joint 128 (FIG. 1) between the lower vertical portion 122b and the lower base portion 120. If used, the gusset plate can be welded or fastened to the lower vertical portion 122b and the lower base portion 120.

With reference again to FIG. 2, the upper bar portion 124 of the present embodiment is attached to the vertical portion 122, such as the first vertical support 122a, and has a section comprising a length that extends away from the upper weld joint 130. In an example, the vertical support 122a is welded to part of the upper bar portion along a weld joint. The upper bar portion 124 is configured to connect to a center support 114, as previously discussed with reference to FIG. 1. In the embodiment of FIG. 2, the upper bar portion 124 has a body 176 comprising an internal baffle 182 to provide the body 176 with two internal cavities 180a, 180b, also called a double hollow cavity. The two internal cavities 180a, 180b may be referred to as a first internal cavity 180a and a second internal cavity 180b separated from the first internal cavity by an internal baffle 182. As further discussed below, the two internal cavities 180a, 180b of the upper bar portion 124 are sized and shaped to receive a bar extension 184 and the center support 114. As the upper bar portion 124 of the present embodiment can receive an end of the center support 114 and provides support for the center support, the upper bar portion can be called a center support joiner.

In an example, the center support 114 has an elongated body 186 comprising a first end 188a and a second end 188b with an end cap 236 and a cross-section that is shaped like an airfoil with a leading edge 194 and a trailing edge 200. The two ends 188a, 188b of the center support 114 are configured to project into the respective first internal cavity 180a at each of the two side supports 112. A bolt galley or T-slot 212 is provided along the upper surface 210 of the elongated body 186, such as lengthwise of the elongated body. In some examples, two or more T-slots 212 can be provided along the upper surface 210. In still other examples, one or more T-slots can be provided along the lower surface, opposite the upper surface. One or more attachment devices can attach to the center support 114 by coupling to the one or more bolt galleys.

As previously discussed, a nut or bolt head can be placed inside a respective T-slot to function as a threaded anchor to fasten another threaded fastener thereto. Multiple fasteners can be placed into the T-slots to fasten multiple other fasteners thereto. The continuous length of the T-slot allows the multiple fasteners to be adjusted along the length thereof to have gaps or desired spacing between them. In an example, one or more light housings or housings having light elements located therein may be attached to the center support 114 via the one or more T-slots to project light over the top of a cab or in any desired directions.

Once inserted into the upper or first internal cavity 180a, the end surface 190 of the elongated body 186, which can be a cap secured to the elongated body 186 by welding, fasteners, detents, etc., can be even or flush with the side edge 192 of the body 176 of the center support joiner 124, can be recessed from the side edge 192 within the internal cavity 180a, or extend beyond the side edge 192 and be exposed externally of the body 176 of the center support joiner 124, such as to the left of FIG. 2. The opposite end of the center support can be similarly arranged.

The cap 190 can be a molded thermoplastic piece having generally the same cross-section as the elongated body 186 and attached thereto using fasteners, such as using one or more screws that anchor against one or more bosses or open rings extruded with the elongated body. In other examples, the cap 190 can be made from a metal material and either fastened to the elongated body 186 or welded to the elongated body. In some examples, detents and fasteners are used to secure the cap 190 to the elongated body of the center support 114. The cap may also be attached using adhesive.

In an example, and as further discussed below, the first internal cavity 180a has generally the same cross-sectional profile as the elongated body 186 of the center support 114 to snuggly receive the center support 114. In another example, the first internal cavity 180a has a width, which is orthogonal to the length of the elongated body 186, that is wider than the width of the elongated body 186 so that the elongated body 186 can shift back and forth within the first internal cavity 180a, between the leading edge 196 of the body 176 of the upper bar portion 124 and the trailing edge 198. Said differently, the internal space of the first internal cavity 180a can be larger than the dimension of the elongated body 186. This allows an installer or user of the modular system 100 to adjust the orientation of the center support 114 within the first internal cavity 180a to angle the leading edge 194 as desired. When so constructed, one or more fasteners may be used to fix the position of the center support 114 within the body 176 after adjusting the leading edge 194 to the desired position. In some examples, the elongated body 186 can shift within the first internal cavity 180a by up to about one (1) inch.

Figure 4:
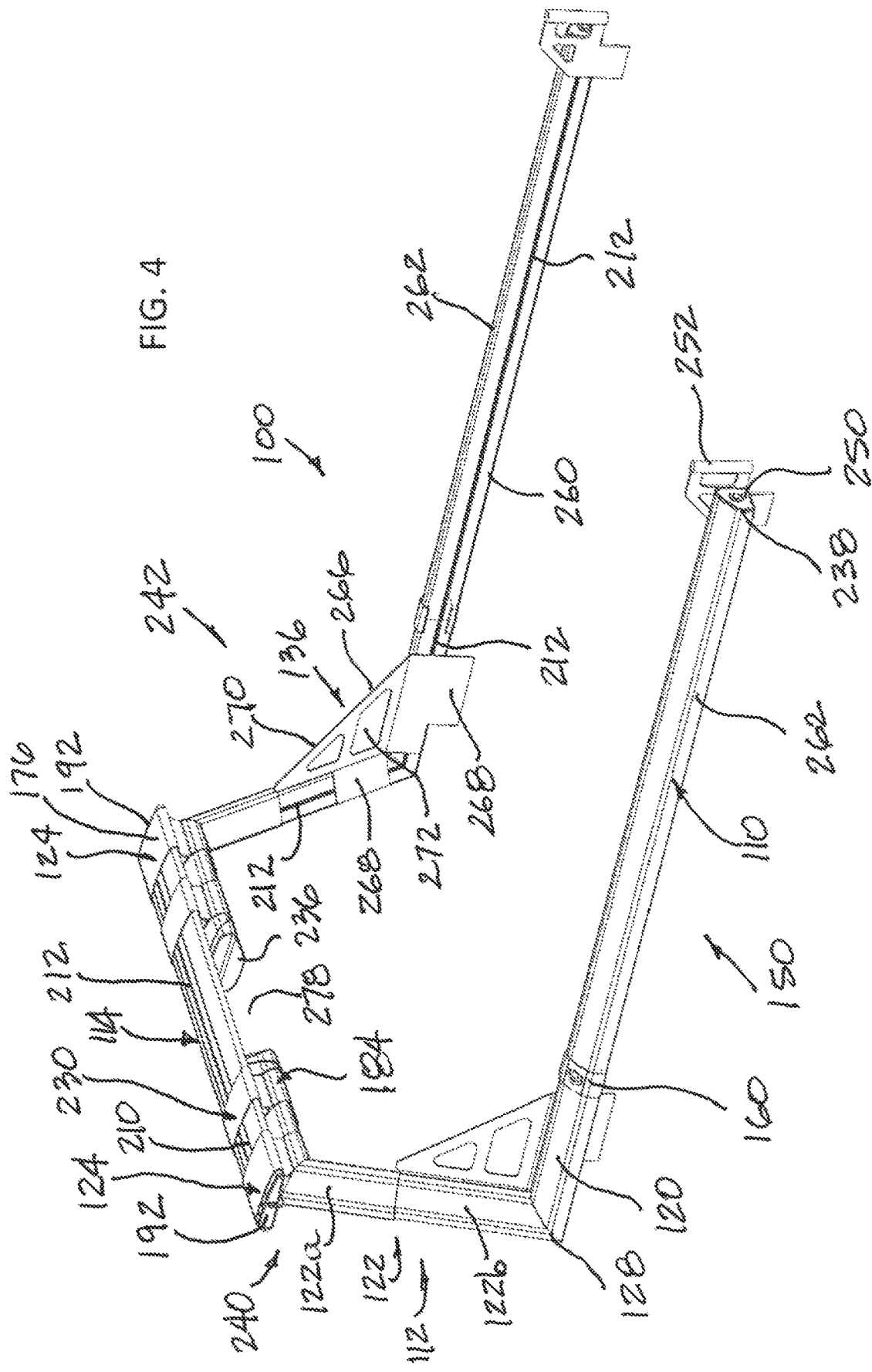
FIG. 4 is a perspective assembled view of a modular support system of the present disclosure, shown without a vehicle and without attachment means.

With continued reference to FIG. 2, the bar extension 184 shown comprises an elongated body 204 comprising a first end 206a and a second end 206b having a cap 236 placed over its end (FIG. 4). The length of the elongated body 204 is shorter than the length of the center support 114 so that the second end 206a of the bar extension does not extend to the opposite side support 112. Instead, the length of the bar extension 184 can be selected so that the second end 206b, when the bar extension 184 is assembled, extends just short of the third rear brake light 107 (FIG. 4) when the modular system 100 is mounted to the bed of a vehicle.

When the modular system 100 of the present disclosure is installed on a truck bed and the two bar extensions 184 extend from the two ends of the two side supports 112, the lengths of the two bar extensions 184 are such that they extend just short of the third rear brake light so that the rear brake light can be exposed or visible through the gap between the two second ends 206b of the two bar extensions 184. In still other examples, the two bar extensions 184 are optional and can be omitted, as further discussed below and shown in FIG. 5.

The elongated body 204 of the bar extension 184 may have a cross-sectional profile having any number of shapes, including round or non-round, such as polygonal, oval, elliptical, irregular, or combinations thereof. The cross-section of the bar extension 184 and the shape of the second or lower internal cavity 180b of the center support joiner 124 should closely match so that the first end 206a of the elongated body 204 can project into the lower internal cavity 180b in a snug fit arrangement.

The bar extension 184 can be secured to the center support joiner 124 by using one or more detents and/or fasteners, such as screws, nuts, bolts, self-tapping screws, etc. As shown, the bar extension 184 comprises a plurality of exposed T-slots 212 in which a channel or track 218 is exposed to the outside environment and a covered T-slot 212a in which the channel or track 218 is located on the inside of the wall surfaces 220 of the elongated body 204. Again, the exposed and covered T-slots may be used with fasteners to mount components to the bar extension 184 or to fasten the bar extension to another component, such as to the center support joiner 124 to secure the bar extension 184 to the second internal cavity 180a of the center support joiner.

Also shown in FIG. 2 is a coupling support 230, which can have the same structure and shape as the center support joiner 124, including having a first or upper internal cavity 180a and a second or lower internal cavity 180b separated from one another by an internal baffle 182. The body 173 of the coupling support 230 may be made by extrusion, such as with an aluminum material. The outer contour of the body 173, the placement or location of the internal baffle 182, and the contour of the internal baffle may be extruded with any number of curves and straight wall surfaces to form the first internal cavity 180a and the second internal cavity 180b having any number of shapes to fit any number of cross-sections for the center support 114 and the bar extension 184. Further aspects of the coupling support 230 are discussed below with reference to FIG. 11.

Figure 5:
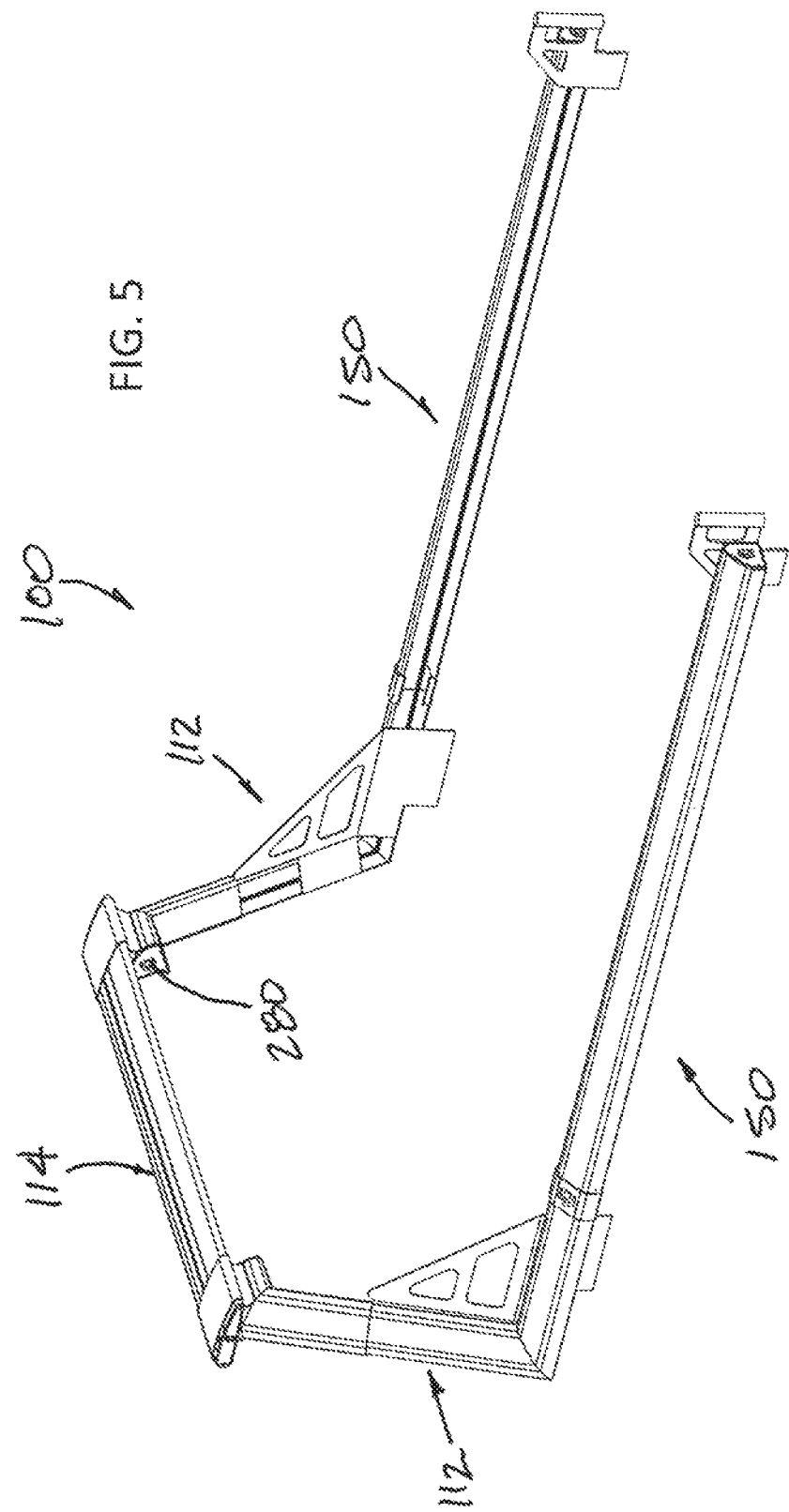
FIG. 5 is a perspective assembled view of an alternative modular support system of the present disclosure, shown without a vehicle and without attachment means.

When the modular system 100 of the present disclosure is assembled, as further discussed below with reference to FIG. 4, the first ends 188a, 206a of the center support 114 and the bar extension 184, respectively, slide through both first and second internal cavities 180a, 180b of both the center support joiner 124 and the coupling support 230. The coupling support 230 can be adjusted relative to the center support joiner 124 by sliding towards or away from the center support joiner 124 along the lengths of the center support 114 and the bar extension 184. Once adjusted, the coupling support 230 may be fixed to the center support 114 and/or the bar extension 184 using fasteners. The coupling support 230 and the bar extension 184 can provide added structural support for the center support 114 and to otherwise add to the bulk and sturdy appearance of the center support 114. In other examples, the bar extension 184 and the coupling support 230 can both be omitted from on both sides of the modular system, as shown in FIG. 5.

Figure 3:
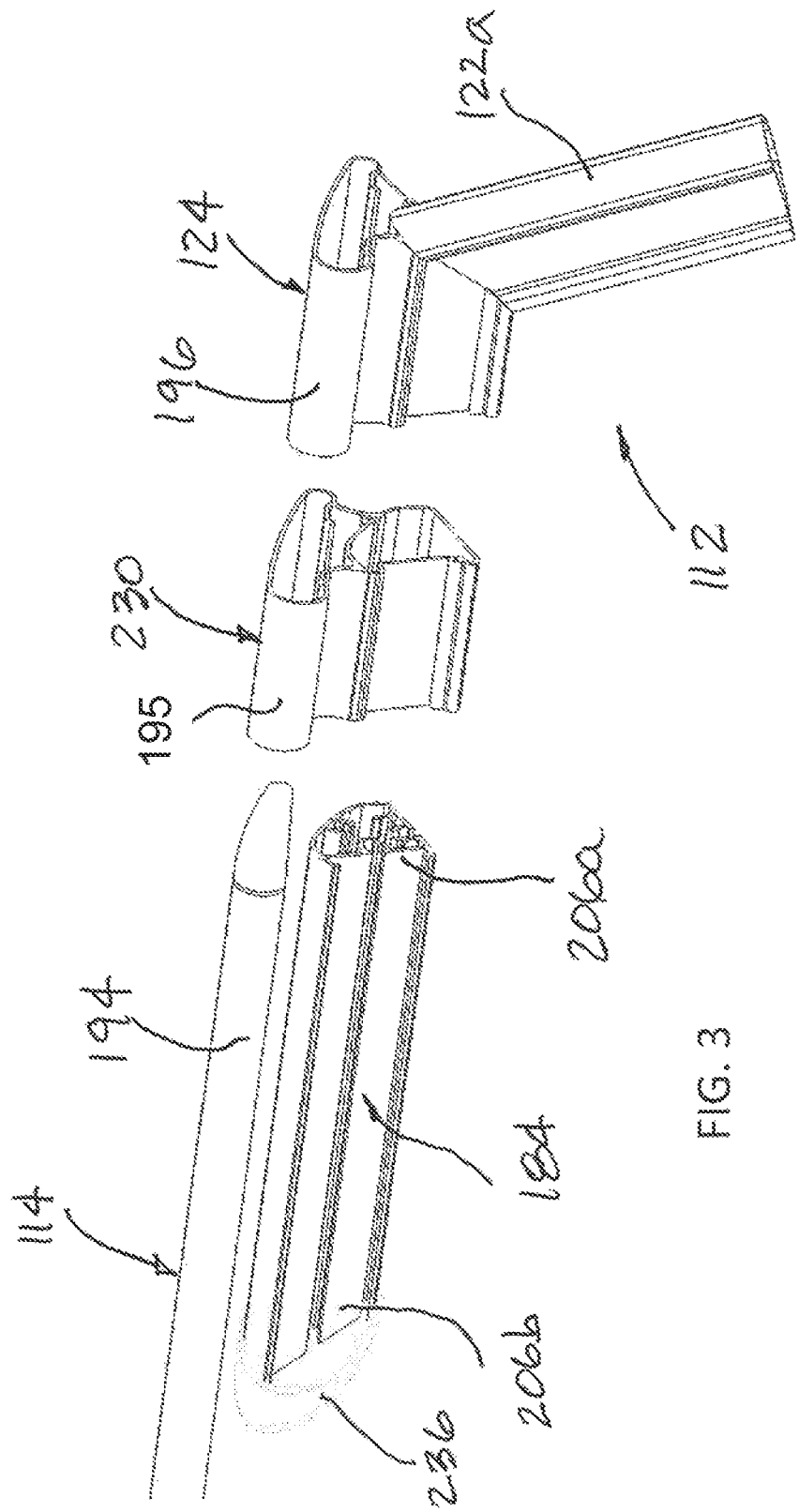
FIG. 3 is a schematic partial exploded view of the components of FIG. 2 from a reversed perspective.

With reference now to FIG. 3, an exploded semi-perspective view of a side support 112 and a center support 114 are shown. The present view shows the same components as those shown in FIG. 2 but from a reverse angle, looking at the leading edges 194, 195 of the center support 114, the coupling support 230, and the center support joiner 124. Also shown from the present viewing perspective is both the first end 206a and the second end 206b of the bar extension 184.

Additionally shown in FIG. 3 is a cap 236 comprising an end wall and a shroud defining an interior to receive the second end 206b of the bar extension 184. The cap can frictionally fit over the second end 206b or loosely fit over the second end and secured thereto using fasteners or the likes. The cap 236 can be made from a plastic material. Optionally, the cap may embody a generally flat metallic plate having a shape that matches the cross-section of the base extension 184 and welded to the end of the second end 206b of the bar extension.

FIG. 4 a perspective view of an assembled modular support system 100 utilizing components of the present disclosure, without a vehicle or a truck bed and without mounting brackets or attachment inserts for use with stake pockets to mount the modular system 100 to the truck bed but are understood to be part of or for use with the modular system of the present disclosure. For example, the modular system comprises the components shown in FIG. 2 and assembled with base supports 110 shown in FIG. 1. In the present embodiment, the first or left side 240 of the modular system 100 is with reference to the view from the free end 238 of one of the base supports 110 on the left of FIG. 4 towards the center support 114 and the second or right side 242 of the modular system is the opposite side.

In the following discussions, reference is made to the left side of the modular system although the same applies to the right side. As shown, the modular system 100 has an overall length measured from an edge of the free end 238 to the front or far surface of the lower vertical portion 122b. The overall length can be selected to match or fit a truck bed of any number of vehicles and comprises approximately the length of the lower base portion 120 of the first side support 112 and the length of the base support 110, previously defined as a bed length support 150.

In some examples, the length of the lower base portion 120 and/or the length of the base support 110 can be selected so that when the two are connected, the overall length is longer than most or all known commercially available pickup beds of various brand pickup trucks. The final overall length can be adjusted by cutting off a section of the lower base portion 120 and/or a section of the base support 110 so that the adjusted length can match the length of the desired pickup bed. In an example, only the length of the base support 110 should be cut down to a final length so that the overall length of the bed length support 150 fits the length of the desired truck bed. The length of the base support 110 can be cut down using a cutting device, such as a miter saw, a hex saw, or similar cutting instruments. The base support 110 may be connected to the lower base portion 120 using a joiner sleeve 160, as further discussed below with reference to FIG. 14.

Also shown at the free end 238 of the base support 110 is an end cap 250 attached to the open end of the free end. In an example, the end cap 250 can be similarly shaped as the cross-section of the base support 110 to provide a close fit and to enclose the open end of the base support. The end cap 250 can include detents that snap into corresponding detents formed internally of the base support. Alternatively, the end cap 250 can be fastened to the free end using one or more fasteners to fasten against one or more bosses or open rings extruded with the elongated body of the base support.

Also shown at the free end 238 is an attachment device 252 connected to the base support 110. In an example, the attachment device 252 is a grip support comprising a body having a grip handle and an access opening, as further discussed below with reference to FIG. 16. The body of the attachment device 252 may be secured to the base support 110 using one or more fasteners to secure to the bolt galley or T-slot 212 that runs the length of the base support. The location of the attachment device 252 can be adjusted anywhere along the length of the base support 110 with the location near the free end 238 being more preferred to permit access for when a user attempts to climb onto a lift gate and/or into a pickup bed.

The fact that the overall length of the bed length support 150 can be adjusted has been described. The overall height of the modular system 100 measured from the upper surface 210 of the center support 114 to the underside surface of the lower base portion 120 near the lower weld joint 128 can also be adjusted will now be described. In an example, the vertical portion 122 of the side support 112 can be provided with a first or upper vertical portion 122a and a second or lower vertical portion 122b that telescope relative to one another to vary the extent of overlap between the two, as previously discussed, to adjust the height of the vertical portion 122. The lengths of the first and second vertical portions 122a, 122b can be selected to give a range of telescoping adjustment, such as between about 4-10 inches with other ranges contemplated. This in turn will allow the overall height or length of the vertical portion 122 to vary for use with different cabin heights of from about 4 inches up to about 10 inches. In other examples, the range of adjustment can be different, such as greater than 10 inches or less than 4 inches.

The width of the present modular support system 100 measured between the two base supports 110 can also be adjusted. As previously alluded to, the center support 114 can be provided with a length that is wider than most if not all commercially available pickup beds of pickup trucks. The center support 114 can then be cut down to length to a desired width measured between the two base supports 110.

Thus, an aspect of the present disclosure further includes end caps that can be fastened to the ends of the center support 114 after the length of the center support is adjusted, such as after the length is cut down from a first length to a shorter second length.

In an example, the final overall width of the modular support system 100 can be determined by the width measured between the two side edges 192 of the two center support joiners 124. In another example, the final overall width of the modular support system 100 can be determined by the width measured between the two inside surfaces 260 of the two bed length supports 150. In still another example, the final overall width of the modular support system 100 can be determined by the width measured between the two outside surfaces 262 of the two bed length supports 150. In still yet other examples, one or more markers can be provided on each of the base support 110 or the side support 112 and the overall width of the modular support system 100 can be measured between the two marker points.

Once the width measured between the two side edges 192 of the two center support joiners 124 is determined, or once the overall width of the modular system 100 is determined and the width measured between the two side edges 192 of the two center support joiners 124 is determined based on the overall width desired for the vehicle that the modular system is to be installed on, the length of the center support 114 can be trimmed or cut down to size based at least in part on the width measured between the two side edges 192 or between two other points of the modular system. For discussion purposes and as an example, the width measured between two inside surfaces 260 of two base supports 110 is 71.5-inches, which can roughly represents the width of a truck bed. However, since the two vertical portions 122 of the two side supports 112 are angled towards one another, the width measured between the two side edges 192 of the two center support joiners 124 is roughly 62.5-inches. The length of the center support 114 can be cut based on this width value between the two side edges. In an example, the length of the center support can then be cut down to be the same length as the width measured between the two side edges 192 plus zero (0) up to about 10 inches, which can define the combined overhang of the center support 114 that extends out beyond the two side edges 192. The overhand length can be centered between the two side edges. In other examples, the combined over-hang lengths can be greater than 10 inches. In still other examples, the ends of the center support 114 can recess from the two side edges.

In some examples, after the two bed length supports 150 are mounted on the two sides of a pickup bed, such as by using clamps attached to the bolt galleys 212 of the two bed length supports 150 and a flange or shoulder on the pickup bed, the width measured between the two side edges 192 of the two center support joiners 124 can then be measured. The length of the center support 114 can then be cut based on this width value between the two side edges 192 of the two center support joiners 124. In an example, the length of the center support 114 can be the same length as the width measured between the two side edges 192 plus zero (0) up to about 10 inches, which can define the overhang of the center support 114 that extends out beyond the two side edges, where zero implies that the two ends of the center support 114 are about even with the two side edges and 10 inches implies that each end of the center support 114 extends about 5 inches beyond the side edge 192. In other examples, the center support 114 can have a final length that is less than the width measured between the two side edges 192 of the two center support joiners 124, which implies that the two ends of the center support recess inside the bodies 176 of the two center support joiners 124.

Fasteners may be used to secure the center support 114 to the two center support joiners 124. In an example, marks may be provided on the outer surface 177 (FIG. 2) of the body of each center support joiner 124 to indicate where one or more anchor screws can be used to project through the body 176 and secure against internal T-slots or surfaces located inside the elongated body 186 of the center support 114. The two coupling supports 230 can then slide towards one another or away from one another as needed along the lengths of the center support 114 and the respective bar extensions 184 to provide added support. Once the spacing of the two coupling supports 230 are selected or determined, they can be secured or fixed using fasteners.

A gap 278 is present between the two end caps 236 located on the two bar extensions 184. When the modular support system 100 is mounted on a bed of a pickup truck, the vehicle's third brake light 107 (FIG. 1) can be seen or visible through the gap 278. Further in that regard, the overall height of the modular system 100 can be adjusted, as discussed above, to ensure that the vehicle's third brake light 107 is located below the center support 114 and not visibly obstructed by the center support 114.

Thus, aspects of the present disclosure are understood to include a modular support system 100 with at least three adjustable aspects, which include the overall length, the overall height, and the overall width of the modular system 100. In some examples, one, two, or all three of the overall dimensions, such as the length, height, and width, can be fixed and not adjustable. For example, the modular system can be provided with a fixed overall height and wherein only the overall length and the overall width can be adjusted.

The modular system 100 of FIG. 4 is further shown with two gusset plates 136, which can be optional. The gusset plates 136 can each comprise a body 266 attached to the vertical portion 122 and the lower base portion 120. In an example, the body 266 is welded to the vertical portion 122 and to the lower base portion 120. As shown, the body 266 has two extended flanges 268 that can include slots or bores so that fasteners can be used to secure the two flanges 268 to the T-slot or bolt galley 212 on the vertical portion 122 and the lower base portion 120. In some examples, the body 266 can be generally triangular in shape, such as a right triangle, an obtuse triangle, or an acute triangle as needed to match the angle between the vertical portion 122 and the lower base portion 120. In some examples, the exterior edge 270 of the body 266 can be other than straight and diagonal and can be customized as desired. One or more optional openings 272 can be provided in the body for aesthetic appeal and/or to serve as tie-down points.

With reference again to the various bolt galleys 212 provided with the modular system 100 and the various surfaces of the various components of the modular system, the present modular system 100 allows adjustability and facilitates simple securement of attachment devices. For example, the various bolt galleys 212, such as those on the two base supports 110, allow grip handles to be mounted thereto (FIG. 4). As another example, an attachment in the form of a tire mount may be attached to the bolt galley for mounting a spare wheel or spare tire. An attachment device in the form of a rear center support bar may extend the width of the two base supports 110 and attach to the bolt galleys 212 of both base supports. Together with the center support 114, this rear center support bar can provide support surfaces for large objects, such as a surf board or a kayak, to rest against and secured thereto. An attachment device in the form of a divider may be provided and attached to the bolt galleys to section off a bed of a pickup truck to provide sectional cargo spaces. An attachment device in the form brackets may be connected to the bolt galleys and provide added surfaces to bolt or connect other objects, such as to secure an ice chest, an ice box, a spare gasoline container. Other attachments are contemplated and are readily usable with the present modular system by attaching to the one or more bolt galleys or drilled and anchored directly into the one or more components of the modular system.

As previously discussed, light elements, such as housed LEDs (light emitting diodes), housed light bulbs, can be mounted to any of the components of the modular system 100 of the present disclosure. For example, the light elements can be bolted to the bolt galley 212 on the center support 114, the bolt galleys 212 on the base supports 110, and/or the bolt galleys on the side supports 112. In an example, a plurality of light elements can be mounted on the modular system 100 in spaced apart relationships, such as two or more light elements on the center support 114 and at least one light element on each or on both base supports 110. Wire or cable channels or paths can be provided throughout the modular system to enable wiring and powering of the mounted light elements while allowing the cables or wires to be secured and possibly hidden. For example, when light elements 114 are mounted on the center support 114, the wire or cable from each housing or from each light element can be routed internally, such as inside the interior of the center support, and then through the internal space of the vertical portion 122 and then coupled or wired to the control and power system of the vehicle. This allows cables to be hidden from view.

With reference now to FIG. 5, a modular support system 100 provided in accordance with further aspects of the present disclosure is shown. The present modular support system 100 is similar to the modular support system 100 of FIG. 4 with a few exceptions. In the present embodiment, the two bar extensions 184 and two coupling supports 230 have been omitted. An end cap 280 is shown connected to the body 176 of the center support joiner 124 to close the opening to the lower or second internal cavity 180b. A similar end cap 280 can be located on the opposite center support joiner 124.

Figure 6:
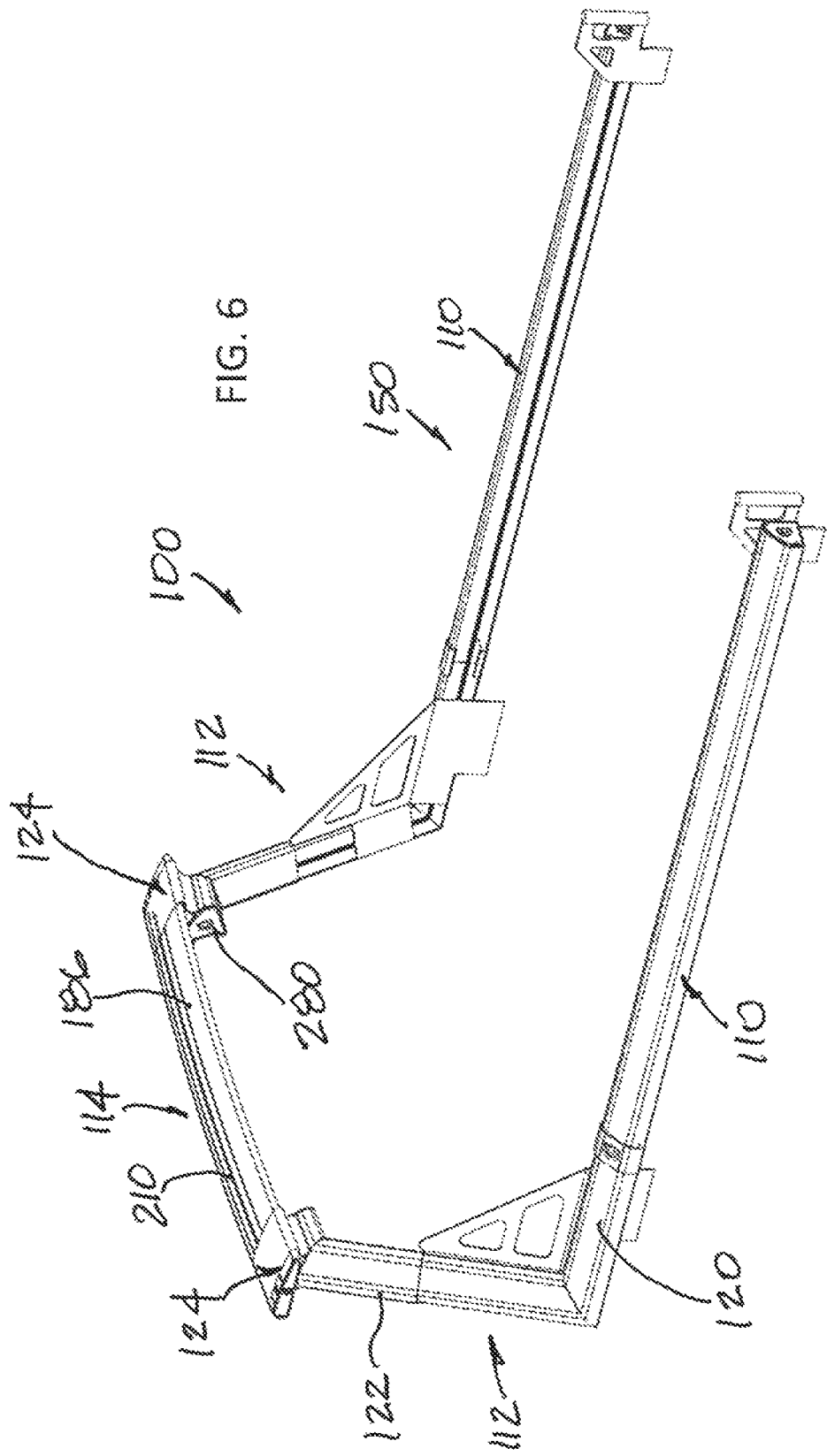
FIG. 6 is a perspective assembled view of an alternative modular support system of the present disclosure, shown without a vehicle and without attachment means.

With reference now to FIG. 6, a modular support system 100 provided in accordance with further aspects of the present disclosure is shown. The present modular support system 100 is similar to the modular support system 100 of FIG. 4 and FIG. 5 with a few exceptions. In the present embodiment, the two bar extensions 184 and two coupling supports 230 have been omitted. An end cap 280 is shown connected to the body 176 of the center support joiner 124 to close the opening to the lower or second internal cavity 180b. A similar end cap 280 can be located on the opposite center support joiner 124.

FIG. 6 further shows the center support 114 having a curve or bow along the length of the elongated body 186 between the two far ends of the elongated body, such as between the two center support joiners 124. The bow can be formed during extrusion or post-extrusion of the elongated body 186 and the center of the elongated body 186 can bow upwardly, away from the intersections between the vertical portion 122 and the lower base portion 120 of the two side supports 112. The bow in the center support 114 can be practiced when the two bar extensions 184 and the two coupling supports 230 are omitted. The bow provides added strength to the elongated body 186 against compressive forces, such as when a load is placed over the top surface 210 of the center support 114.

Figure 7:
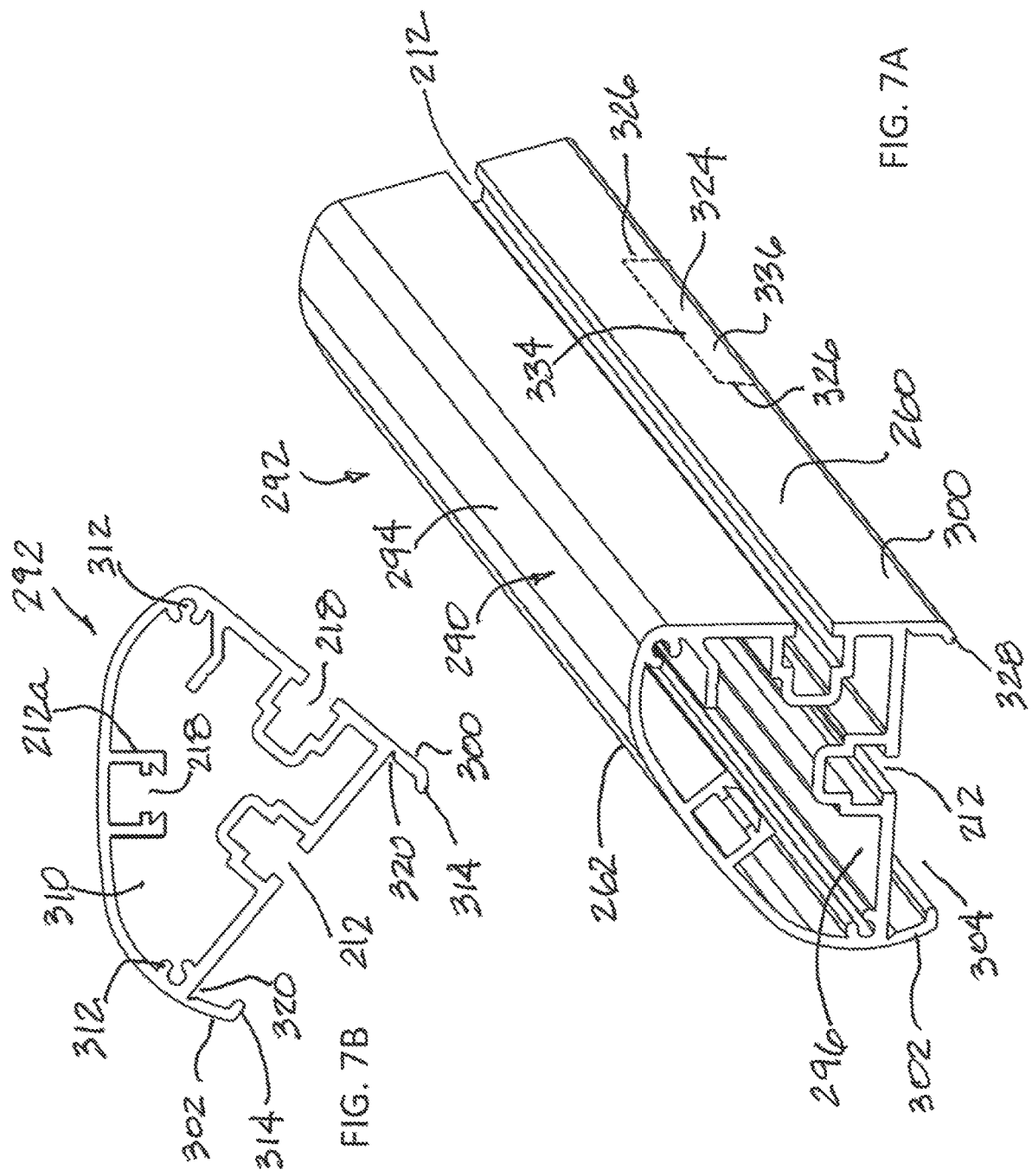
FIG. 7A is a perspective view of a section of a structural support member and FIG. 7B is an end view or a cross-sectional view of the section of FIG. 7A.

With reference now to FIGS. 7A and 7B, a perspective view of a section 290 of an elongated rigid structural element 292 capable of providing support and a cross-sectional or end view of the same section, respectively, are shown. The elongated rigid structural element 292 can be formed by extrusion and in one example can be an extruded aluminum structural element 292. Different lengths of the structural element 292 of FIGS. 7A and 7B can be used to form the bar extensions 184 and the two base supports 110 of FIG. 4. Different lengths of the structural element 292 of FIGS. 7A and 7B can also be used to form the lower vertical portions 122b and the lower base portions 120 of FIG. 4. However, the upper vertical portions 122a of FIG. 4 are made from a different rigid structural element than shown in FIGS. 7A and 7B since the upper vertical portions 122a should have hollow interiors, preferably without any ribs, tracks, or flanges, in order to receive the respective lower vertical portions 122b in a telescoping arrangement, as previously described.

Figure 10:
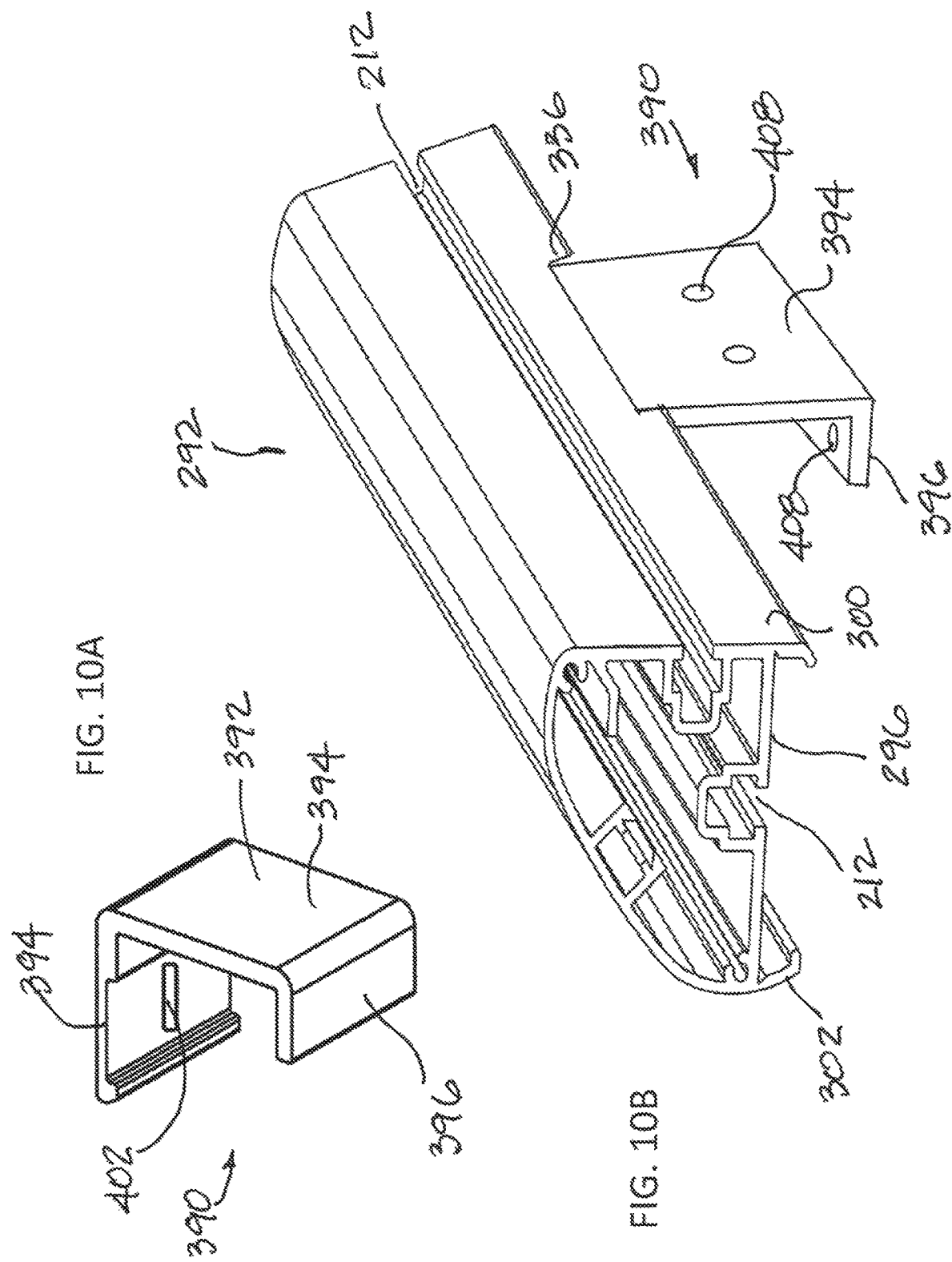
FIG. 10A is a mounting bracket and FIG. 10B shows the mounting bracket attached to a section of a support element.

As shown, the elongated rigid structural element 292, or "element 292" for short, has an elongated body 294 comprising an inside surface 260 and an outside surface 262, both relative to the center of a bed of a pickup when the modular system 100 is mounted to the vehicle. The body 294 further comprises a base wall 296, which is configured to face the upper landing of a pickup bed sidewall. An inside flange 300 extends from the inside surface 260 and an outside flange 302 extends from the outside surface 262 to create or define a channel 304 with the base wall 296. The channel 304 can be incorporated to provide space for accommodating other items or components. For example, the channel 304 can accommodate wiring, fasteners, and other objects between the base wall 296 and the upper landing of a pickup bed sidewall. In a particular example, a mounting bracket, as shown in FIG. 10A, can be placed at least partially within the channel 304 and secured therein using one or more fasteners for fastening against the lower bolt galley 212.

With continued reference to FIGS. 7A and 7B, the element 292 is provided with two T-slots or bolt galleys 212 each with an exposed channel 218 to the atmosphere and a covered T-slot 212a having an open channel 218 located in the interior space 310 of the element 292. Also shown are two bosses or open rings 312 for receiving hold down screws. For example, the end caps 250 on the two base supports 110 and the end caps 236 on the two bar extensions 184 (FIG. 4) can be anchored to the respective elements using fasteners to fasten the caps against the two open rings 312.

The inside flange 300 and the outside flange 302 each comprises a curved lip 314 at a free end thereof. The curved lips 314 provide added interference or contact surfaces so that when the elongated rigid structural element 292 is placed onto the upper landing of a sidewall of a truck bed, the contacts between the two flanges 300, 302 and the upper landing are more than a knife-edge contact. Said differently, the curved lips 314 can add to contact points with the upper landing of a sidewall of a truck bed.

As more clearly shown in FIG. 7B, a notch 320 is provided at the base of the inside flange 300 and the base wall 296 and another notch 320 is provided at the base of the outside flange 302 and the base wall 296. The two notches 320 provide weakened sections or areas of diminished strength that can facilitate separation of part or parts of the two flanges from the elongated body 294 of the rigid structural element 292, as further discussed below.

With further reference to FIG. 7A, if a flange piece 324 is desired to be removed in order to gain access to the channel 304 from the side of the inside surface 260, a pair of spaced apart short slots or cuts 326 can first be made to the inside flange 300 using a wire cutter, a hex saw, or other cutting instruments. The short slots or cuts 326 can each be made from the outer edge 328 of the inside flange 300 and extends to the notch 320 near the base wall 296. Then by using a channel lock or a pair of pliers, the flange piece 324 can be gripped and flex back and forth to sever the flange piece 324 along the base line 334 of the flange piece, coincident with or near the notch 320. The notch 320 weakens the connection and allows the flange piece 324 to readily snap off from the remainder of the element 292. A three-sided access opening 336 can therefore be provided through the inside flange 300 and into the inside channel 304 of the element 292 by removing the flange piece 324 from the inside flange 300. A similar three-sided access opening 336 can be made or obtained at the outer flange 302. If the flange piece 324 is removed from an end most section of the element 292, only a single short cut or notch 326 is needed before the flange piece can be gripped to snap off.

Again, the flange piece 324 can be removed by first making two short cuts or short slots 326 through the inside flange 300. The flange piece 324 can then be flexed back-and-forth to snap off from the elongated body 294 along a base line 334 near the notch 320 or at the notch. The notch 320 provides a weakened connection that readily snaps or severs. The surface where the flange piece 324 separates from the elongated boy can then be cleaned, smoothed, or processed, such as filed down, using a file, sand paper, or sander. As further discussed below with reference to FIG. 10B, a bed bar clamp can project through the access opening 336 on the inside flange 300 to secure against the bolt galley 212. Part of the bed bar clamp can extend away from the part that projects inside the channel 304 (FIG. 7A) and can extend downwardly to attach to the rim or ledge on the sidewall of the pickup bed to secure the element 292 to the pickup bed. In some examples, two or more such bed bar clamps can be used for each bed length support 150 (FIG. 4) to secure the modular support system 100 to the pickup bed.

Figure 8:
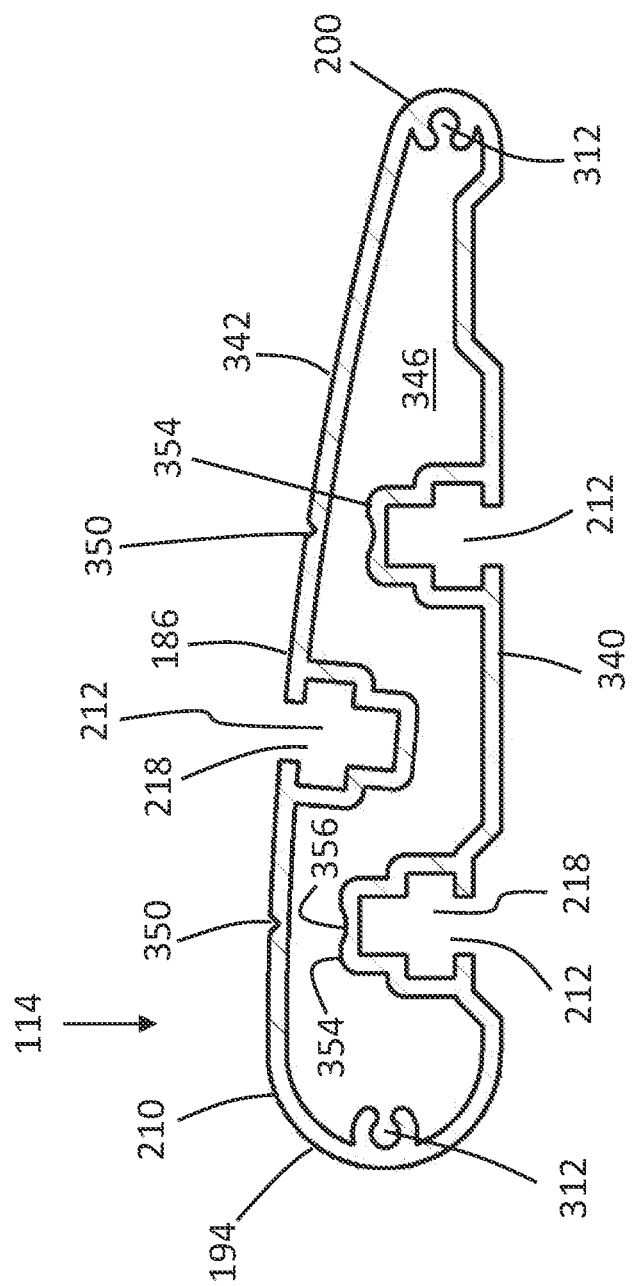
FIG. 8 is an end view or a cross-sectional view of a center support structure of the present disclosure.

With reference now to FIG. 8, a cross-sectional view of a center support 114 is shown, which can be similar to the center support 114 of FIGS. 2, 4 and 5. The center support 114 is an elongated rigid structural element capable of providing support. The elongated rigid structural element can be formed by extrusion and in one example can be an extruded aluminum structural element. As shown, the center support 114 has an elongated body 186 having an airfoil cross-section with a leading edge 194 and a trailing edge 200. The elongated body 186 has an upper surface 210 having a somewhat curved or non-planar profile and a lower surface 340 that is generally planar or at least more planar than the upper surface 210. In some examples, the lower surface 340 has generally the same curvature as the upper surface. The airfoil cross-section provides a more aerodynamic cross-bar for a bed rail system than a typical round cross-bar. Further, the leading edge 194 can be located above the upper surface of the vehicle's cab and the aerodynamic shape of the center support 114 decreases drag.

The thickness of the cross-section at the leading edge 194 is larger than the thickness at the trailing edge 200. Further, the width measured from the leading edge 194 to the trailing edge 200 is about 3 to 6 times the largest thickness of the elongated element near the leading edge. In other examples, the ratio can be less than 3 or greater than 6. In a particular example, the width measured from the leading edge 194 to the trailing edge 200 is about 4 to 4.5 times the largest thickness of the elongated element near the leading edge. The material thickness of the elongated body 186 is about 0.35 cm to about 0.6 cm aluminum. The material thickness of other components described herein may be in the same range. However, clamps or other holding components may be reinforced with a greater thickness.

A plurality of bolt galleys or T-slots 212 can be provided with the center support 114. In an example, one bolt galley 212 with an exposed channel 218 can be provided with the upper surface 210 and two bolt galleys 212 each with a channel 218 can be provided on the lower surface 340. Various attachment devices can attach to the bolt galleys via fasteners, as previously discussed.

The wall surfaces 342 define an interior space or cavity 346 having a boss or open ring 312 at or near the leading edge 194 and a boss or open ring 312 at or near the trailing edge 200. A cap can be secured to the elongated body 185 by using fasteners, such as threaded screws or self-tapping screws, to thread into the two open rings or bosses 312. In an example, the upper surface 210 is provided with a notch 350 that runs lengthwise of the elongated body 186. In a particular example, two space apart notches 350 can be provided on the upper surface 210 with each running lengthwise of the elongated body 186. When provided, each notch 350 can be located superjacent a base 354 of a bolt galley 212, which is located subjacent the notch 350, and both the notch and the base can extend along a length of the elongated body. Further, each base 354 of the two bolt galleys 212 can have a concave surface 356 located subjacent the corresponding notch 350. The notch 350 is configured signify where to screw into the upper surface 210 of the elongated body 186 when securing an object to the elongated body and the concave surface 356 of a base 354 is configured to direct the tip of the screw to the apex or low point of the concave surface 356 to screw into so that a solid connection can be assured.

With reference again to FIG. 4 in addition to FIG. 8, the upper surface 177 of the center support joiner 124 can be provided with two spaced apart holes that align with the two rows of notches 350 on the upper surface 210 of the center support 114. Following cutting or trimming the center support 114 to a desired overall length, which represents the width of the modular system of FIG. 4, fasteners can be used to project through the holes on the upper surface 177 and then drilled at the locations of the two notches 350 to then anchor into the two bases 354 subjacent the two notches to secure the elongated body 186 of the center support to the center support joiner 124. The same process can be repeated for the opposite end of the center support 114. Cables, attachments, or other components can similarly be secured to the center support 114 by either bolting onto one of the bolt galleys 212 or by threading one or more screws through the one or more notches 350 and into the two bases 354.

Where an attachment device that connects to the center support 114 has a cable or a cord, such as a housing of a light element having a power cord extending therefrom, an opening or through hole can be provided near the attachment, such as through the upper surface 210 or the lower surface 340, then routed through the interior cavity 346 of the elongated body 186. The cable can then be routed through the interior of one of the vertical portions 122 (FIG. 4) and then to a power and control system for controlling the light element.

Figure 9:
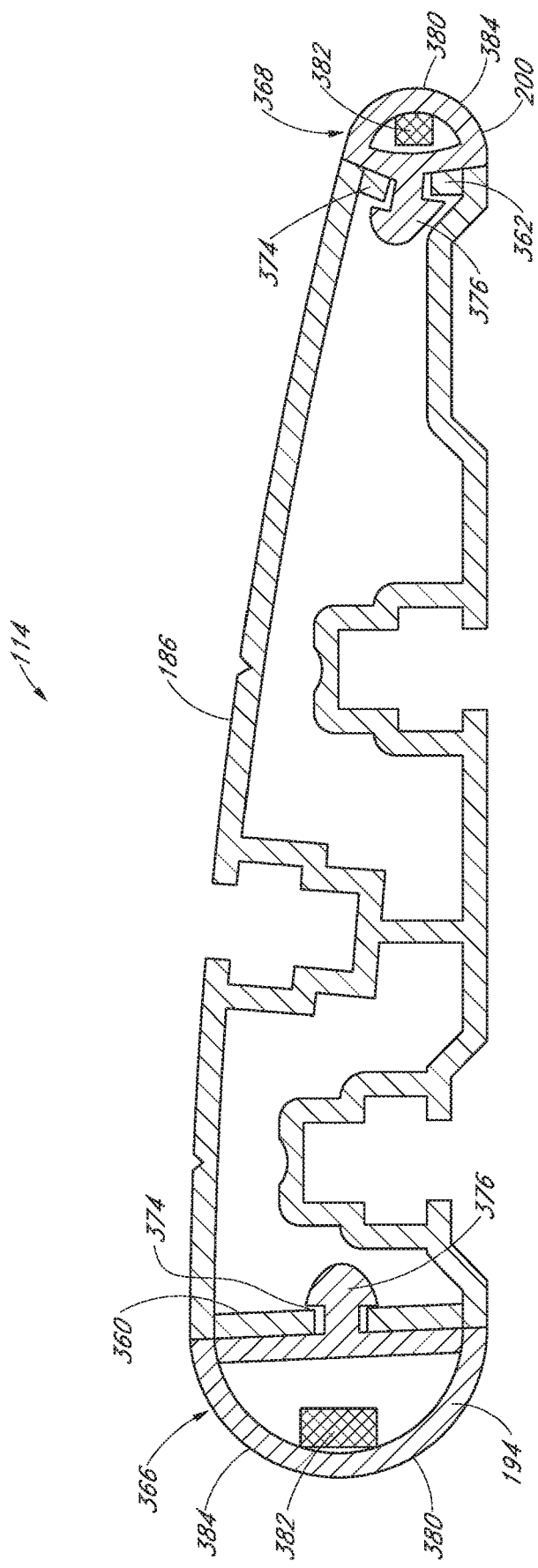
FIG. 9 is an end view or a cross-sectional view of an alternative center support structure of the present disclosure, shown with a leading edge attachment and a trailing edge attachment.

With reference now to FIG. 9, a cross-sectional view of an alternative center support 114 is shown, which can be similar to the center support 114 of FIGS. 2, 4, 5, and 8 with a few exceptions. The present center support 114 is an elongated rigid structural element capable of providing support. The elongated rigid structural element can be formed by extrusion and in one example can be an extruded aluminum structural element. As shown, the center support 114 has an elongated body 186 having an airfoil cross-section but without a curved leading edge 194 and/or a curved trailing edge 200. Instead, the elongated body 186 is extruded with an upper surface 210 having a somewhat curved or non-planar profile and a lower surface 340 that is generally planar or at least more planar than the upper surface 210. In some examples, the lower surface 340 has generally the same curvature as the upper surface. The leading or front edge of the elongated body 186 is provided with a leading attachment wall surface 360 and the trailing or rear edge of the elongated body is provided with a trailing attachment wall surface 362. A separate leading edge attachment 366 is configured to attach to the leading attachment wall surface 360 to form or define a leading edge 194. A separate trailing edge attachment 368 is configured to attach to the trailing attachment wall surface 362 to form or define a trailing edge 200.

In an example, the leading attachment wall surface 360 and the trailing attachment wall surface 362 can both be provided with a plurality of female detents 374 or male detents 376 and the leading edge attachment 366 and the trailing edge attachment 368 can both be provided with a plurality of the other one of female detents 374 or male detents 376 to provide enable connection. In an example, the leading edge attachment 366 is a light strip 380 comprising a plurality of light elements 382. For example, the light elements 382 can be LEDs having the desired lumen and color, such as white or off-white, and set inside cured epoxy having a curved projecting surface 384. The leading edge attachment 366 can alternatively embody a housing having a hollow interior having a plurality of light elements mounted therein. The light strip 380 can extend the length of the center support 114 and can be wired to control and power the light elements with a switch located inside and/or outside the cabin of the vehicle.

In an example, the trailing edge attachment 368 is a light strip 380 comprising a plurality of light elements 382. For example, the light elements 382 can be LEDs having the desired lumen and color, such as brake-light red, and set inside cured epoxy having a curved projecting surface 384. The trailing edge attachment 368 can alternatively embody a housing having a hollow interior having a plurality of light elements mounted therein. The light strip 380 can extend the length of the center support 114 and can be wired to the vehicle's braking system to control and power the light elements whenever night lights of the vehicle are turned on and/or whenever the vehicle's brakes are activated. In some examples, the leading edge attachment 266 and the trailing edge attachment 368 are optional features that can have a range of different contours to enable a user to mount different shaped attachments, such as more rounded or more angular contours, to give a different appearance for the leading edge 194 and the trailing edge 200.

A mounting bracket or hold down member 390 in accordance with aspects of the present disclosure is shown in FIG. 10A and the mounting bracket 390, shown schematically, attached to an elongated structural element 292 is shown in FIG. 10B, which can be the same or similar to the element 292 of FIG. 7A, which can be the same structure used for the base supports 110, the bar extensions 184, the lower vertical portions 122b, and the base portions 120 of FIG. 4. With initial reference to FIG. 10A, the mounting bracket 390 comprises a body 392 comprising a first section 394, a second section 396, and a third section 398. The mounting bracket 390 can be a unitarily formed structure and can be made from an aluminum material. The first section can be arranged at a right angle to the second section and the second section can be arranged at a right angle to the third section. In other examples, the angles can be other than right angle. The mounting bracket 390 has a greater thickness than the thickness of the various elongated structural sections or elements 292 to provide added rigidity to secure the modular system 100 to the bed of a pickup truck.

In an example, the first section 394 can have a length, a width, and a slot 402, which can be a through hole, for receiving one or more fasteners, such a bolt or a screw. In other examples, additional slots can be provided. With further reference to FIG. 10B, the first section 394 is sized and shaped to project through the access opening 336 of the rigid element 292 and secured to the rigid element 292 using one or more fasteners fastened to the bolt galley 212 at the base wall 296. Before final tightening of the one or more fasteners, alignment can be adjusted by moving the fasteners located within the slot 402 and moving the mounting bracket 390 relative to one another. In some examples, there can be two or more slots 402 for receiving two or more fasteners.

The second section 394 extends away from the base wall 296 or the support element 292 and terminates at the third section 396. The second and third sections 394, 396 can be sized and shaped to clear or accommodate different flanges or mounting surfaces on a pickup bed. In an example, at least the second section 394 is provided with extra length or height so that set screws or bolts can be placed through the bolt holes or bolt slots 408 on the third section 396 and adjusted, via a combination bolt and threaded shank, to load against the truck bed. For example, a mounting surface of a truck bed can locate in the space between the first section 394 and the third section 396. An adjustment fastener can then project through the bolt hole or bolt slot 408 of the third section and pushed against the mounting surface of the truck bed. The adjustment fastener can be held in the loaded position against the mounting surface of the truck bed using one or more bolts held against the constraint of the third section 396.

Additional bolt holes or bolt slots 408 can be provided through the second section 394 to secure the mounting bracket 390 against a different surface of the pickup bed.

Figure 11:
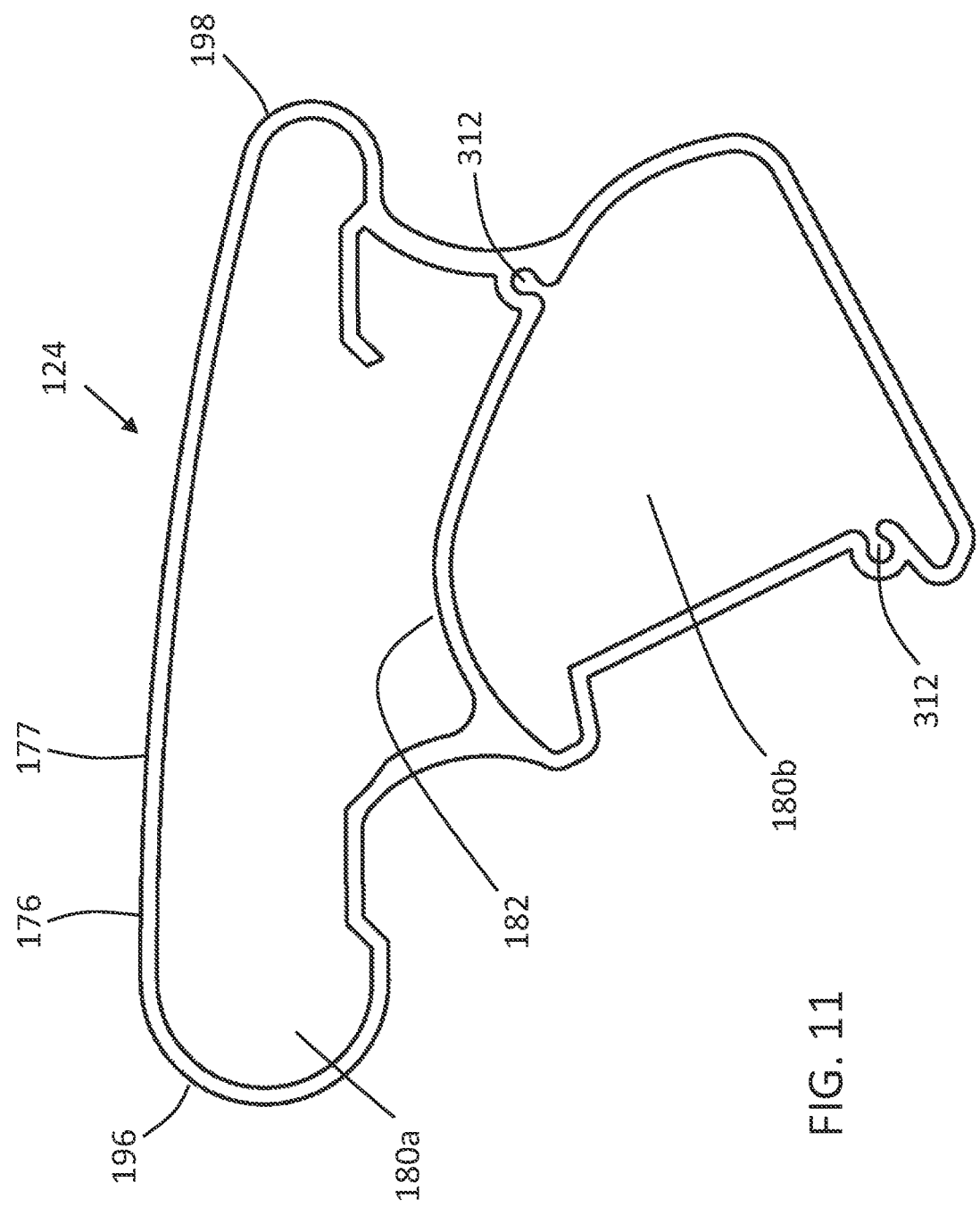
FIG. 11 is an end view or a cross-sectional of a center support joiner shown in FIGS. 2 and 4.

FIG. 11 is an end view or a cross-sectional view of a center support joiner 124 and a coupling support 230, which is similar to the center support joiner 124 and coupling support 230 of FIGS. 2 and 4.

Figure 12:
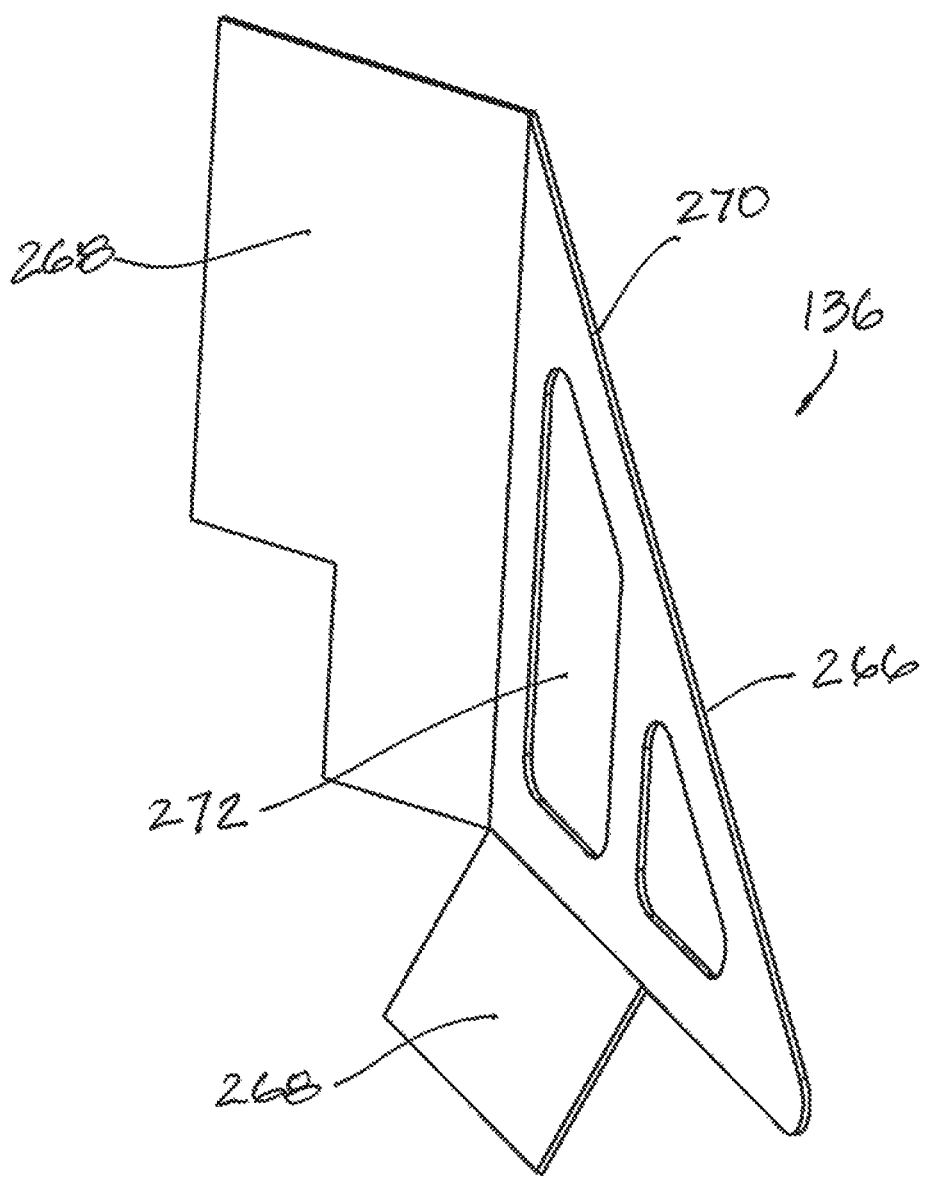
FIG. 12 shows an attachment device in the form of a gusset plate, as shown in FIG. 4, which is optional.

FIG. 12 is a perspective view of a gusset plate 136, which is similar to the gusset plate 136 of FIG. 4.

Figure 13:
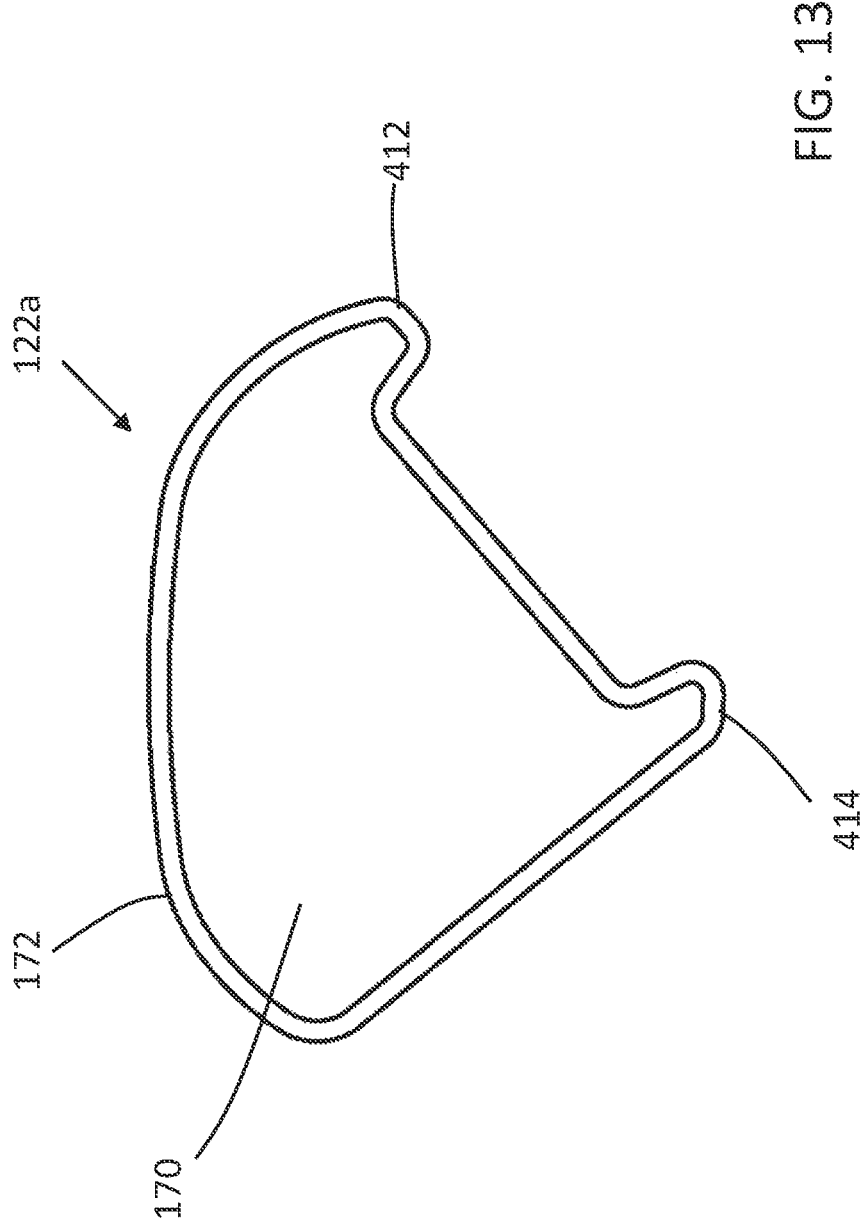
FIG. 13 is an end view or a cross-sectional view of a vertical support portion, as shown in FIG. 2.

FIG. 13 is an end view or a cross-sectional view of a support element 122a, which is similar to the upper vertical portion 122a of FIGS. 2 and 4. As shown, the support element 122a has a wall structure defining a body 172 having a contour that is similar to the contour of the lower vertical portion 122b of FIG. 4, which is similar to the cross-section shown in FIG. 7B. However, the present support element 122a has a hollow interior 170 and two extended hollow extensions 414 to receive the outer flange 302 and the inner flange 300 of the lower vertical portion 122b in a telescoping arrangement, as previously discussed.

Figure 14:
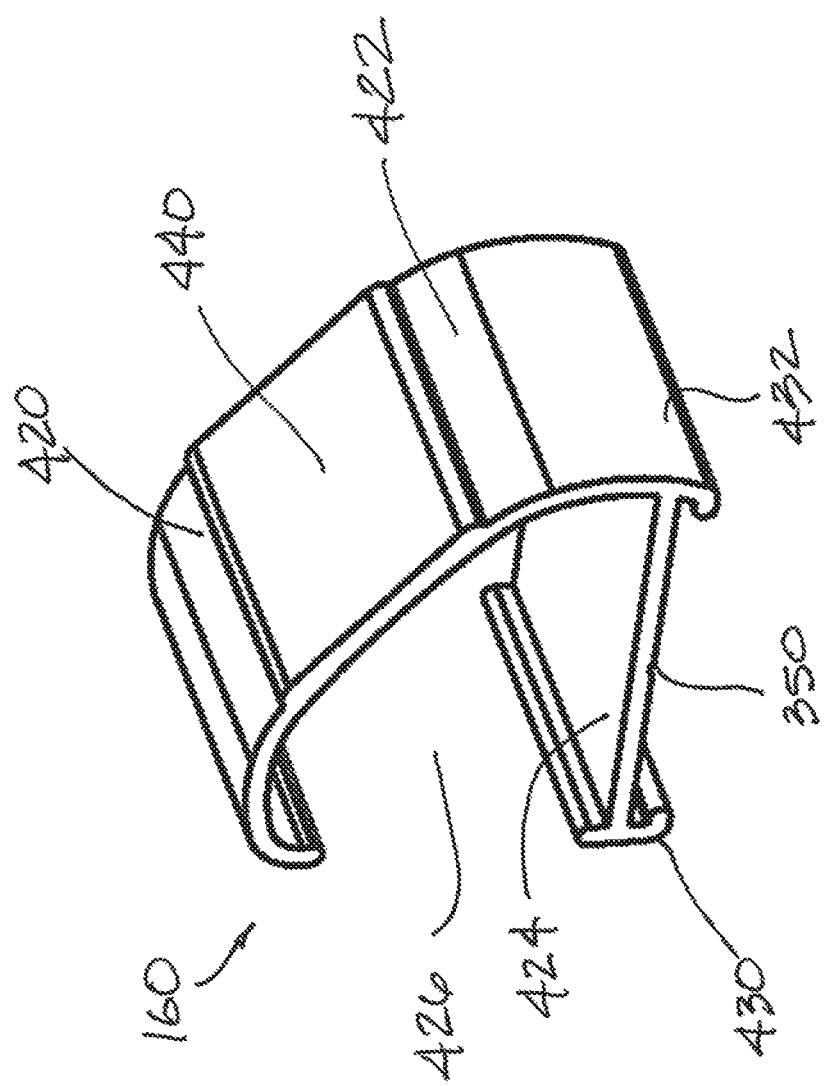
FIG. 14 is a perspective view of a joiner sleeve provided in accordance with aspects of the present disclosure.

FIG. 14 is a perspective view of a joiner sleeve 160, which is similar to the joiner sleeve 160 of FIG. 4, for covering the intersection between a base support 110 and a lower base portion 120 of a side support 112. As shown, the joiner sleeve 160 comprises a body 420 comprising a curved section 422 attached to a base section 424. A cavity or receiving space 426 with an open channel is defined between the curved section and the base section. An end of the lower base portion 120 and an end of the base support 110 are configured to project into the receiving space 426 of the joiner sleeve so that the curved section 422 covers the intersection or interface between the two ends, as shown in FIG. 4. A partial access opening 336 (FIG. 7A) can be removed from both the inner flange 300 and the outer flange 302 of both the lower base portion 120 and the base support 110 at the two covered ends to accommodate the inside flange 430 and the outside flange 432 of the joiner sleeve 160 (FIG. 14).

At least one fastener for use at each end of the lower base portion 120 and the base support 110 can be used to secure the joiner sleeve 160 to the two ends. In one example, the at least two fasteners can project through the curved section 422 of the joiner sleeve 160 to secure to the two ends of the lower base portion 120 and the base support 110. In an alternative embodiment, the at least two fasteners project through one or two slots or holes located on the base section 424 of the joiner sleeve 160 to secure against the bolt galley 212 on the lower base portion 120 and the bolt galley 212 on the base support 110.

An information surface 440 can be provided on the curved section 422 of the joiner sleeve 160. In an example, the information surface 440 can be provided to affix information, in text or picture form, on the surface thereof. For example, a model number, serial number, logo, manufacturer information, or customized information or art can be machined, scribed, molded, or etched onto the surface as needed or as desired.

Figure 15:
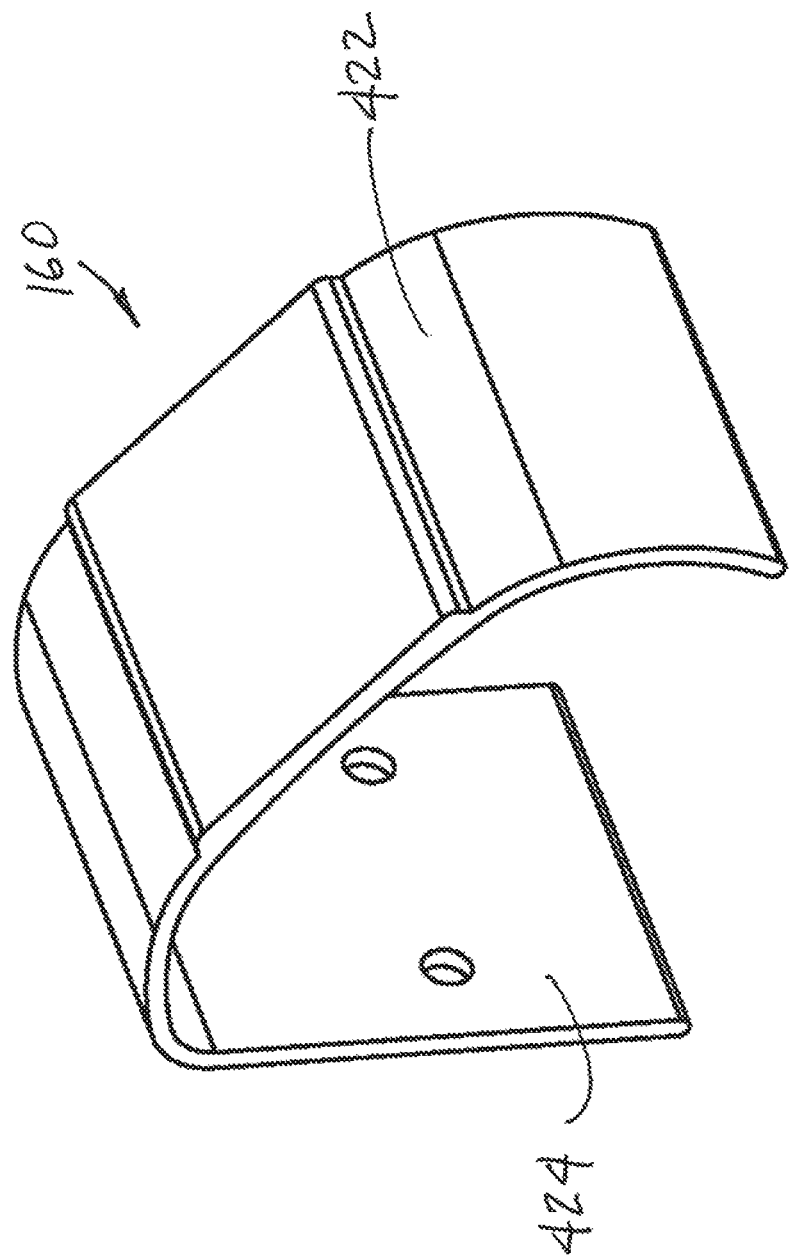
FIG. 15 is a perspective view of an alternative joiner sleeve provided in accordance with aspects of the present disclosure.

FIG. 15 is a perspective view of an alternative joiner sleeve 160 provided in accordance with aspects of the present disclosure. The present joiner sleeve 160 is similar to the joiner sleeve 160 of FIG. 14 with a few exceptions. In the present embodiment, the base section 424 and the curved section 422 are provided without an inside flange 430 or an outside flange 432 (FIG. 14). Thus, the present joiner sleeve 160 may be used to couple the two ends of the lower base portion 120 and the base support 110 together without first removing part of the inner flanges 300 and outer flanges 302 from the elongated structural supports 292 to create access openings since the present joiner sleeve 160 is without inner and outer flanges.

Figure 16:
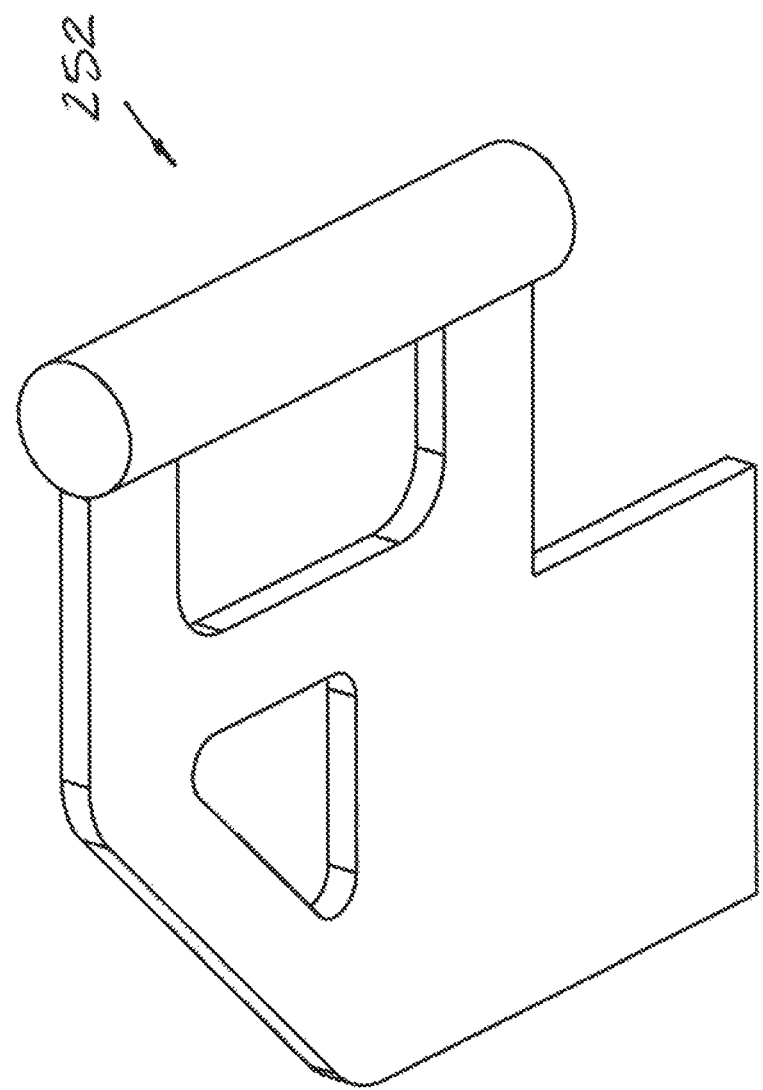
FIG. 16 shows an attachment device in the form of a support handle.

FIG. 16 is a perspective view of an attachment device 252 in the form on a support handle 250, which is similar to the attachment device 252 of FIG. 4.

Figure 17:
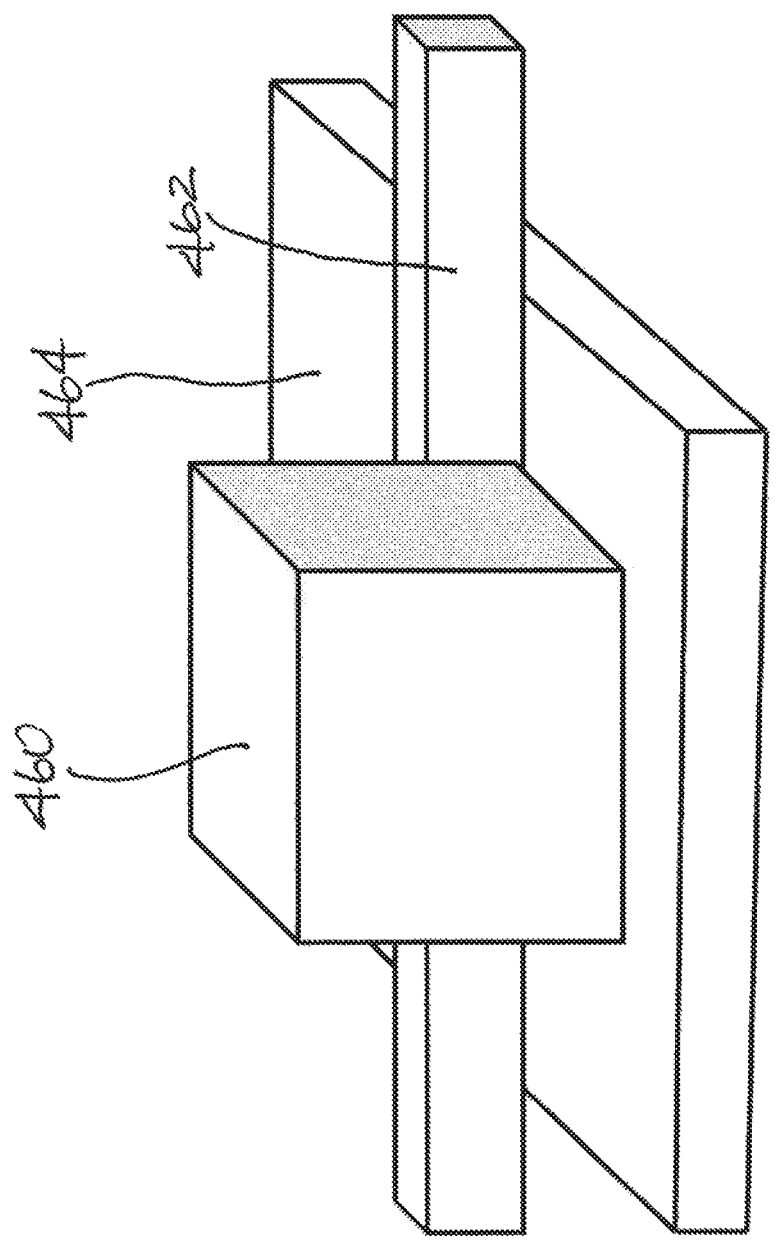
FIG. 17 is a schematic view of two shipping boxes located on a pallet.

FIG. 17 is a perspective view of two shipping boxes 460, 462 positioned atop a pallet 464. The components of a modular support system 100 of the present disclosure can be packaged inside the two boxes and shipped to any final destination with delivery services for assembling as shown in the various figures and described herein on top of a bed of a pickup truck, as shown in FIG. 1. In some examples, more than two shipping boxes may be required to package and ship the various components of the present modular system 100. For example, the two base supports 110, the center support 114, and the bar extensions 184, the latter if incorporated, can be packaged in the longer shipping box 462 while the remaining components can be packaged in the shorter but taller shipping box 460. Some of the disclosed components, such as the joiner sleeves 160, fasteners, etc., may also be included in the longer shipping box 462. In other examples, only a single shipping box is required or used.

The ability of the present modular support systems 100 to adjust its overall height, length and width, as discussed above, enables the system of the present disclosure to be shipped in one or more shipping boxes to any final destination with delivery services to then assemble on a range of pickup truck types with different pickup bed and cab sizes. Thus, the modular support systems can be manufactured and be used across a range of vehicles allowing the present systems a greater range of applications than prior art bed rail systems.

Figure 18:
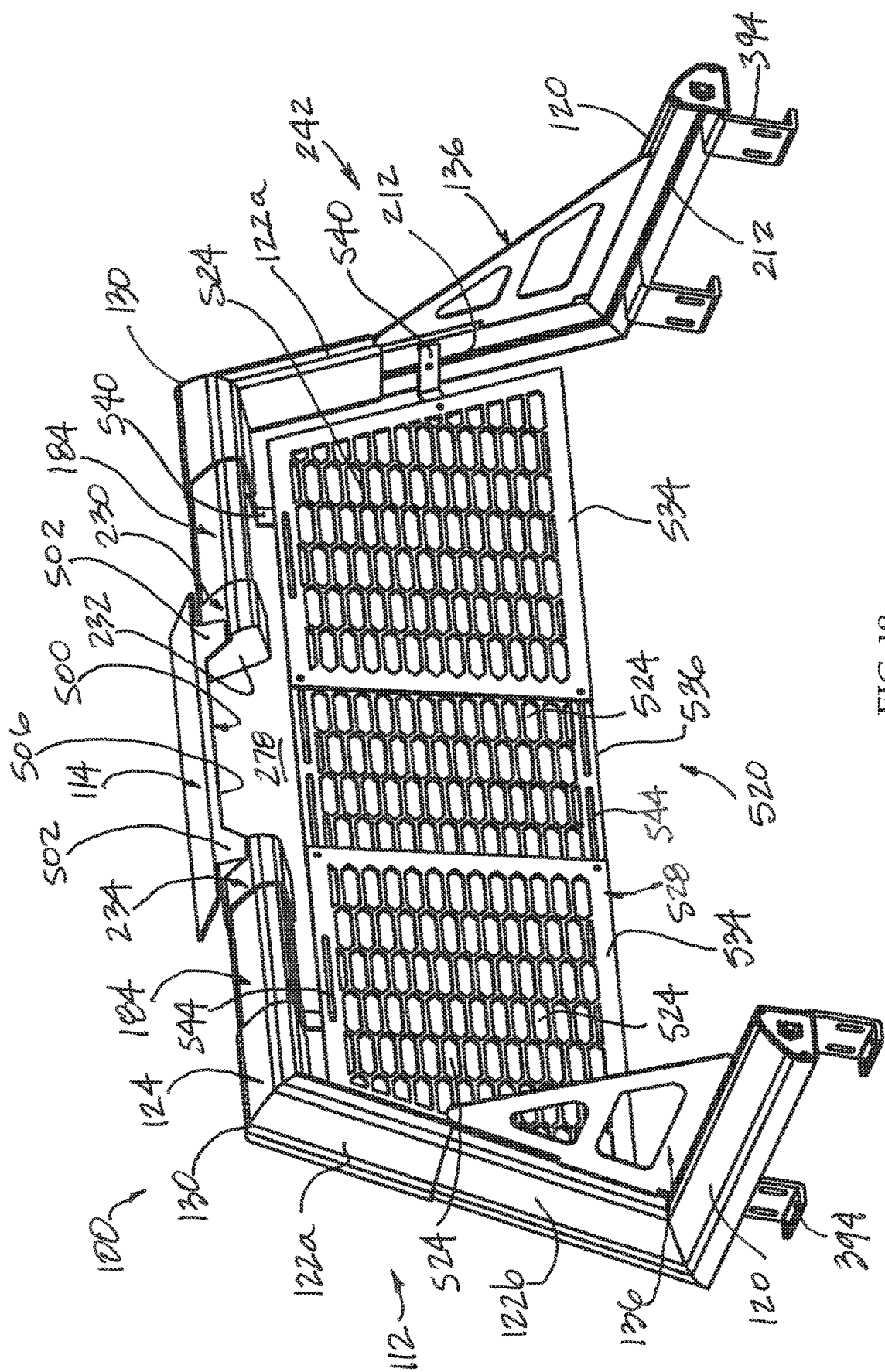
FIG. 18 is a perspective assembled view of a modular support system of the present disclosure, shown without a vehicle.

With reference now to FIG. 18, a modular support system 100 provided in accordance with further aspects of the present disclosure is shown. The present modular support system 100 is similar to the modular support system 100 of FIGS. 4-6 with a few exceptions. Mounting brackets can be used with the present modular support system 100 to secure the support system to a pickup truck bed. Alternatively, as discussed above with reference to FIG. 4 and elsewhere, attachment inserts for use with stake pockets can be used to mount the modular system 100 to the truck bed. In the present embodiment, the first or upper vertical portions 122a of the two side supports 112, 242 are attached to a respective single cavity center support joiner 124. Each first vertical portion 122a can be telescopically coupled to a second or lower vertical portion 122b. A weld joint 130 can be provided between the upper vertical portion 122a and the single cavity support joiner 124, similar to the embodiment of FIG. 1. Each lower vertical portion 122b can be connected to lower base portion 120, similar to that of FIGS. 1 and 4-6, which can in turn be extended by a base support 110 to define an overall bed length support 150, as previously described. Alternatively, the overall bed length support 150 can be shortened as shown in FIG. 18 or a base support 110 can be included but the overall length does not have to extend the full length of the bed of a pickup truck.

As shown, a bar extension 184 is connected to each of the two single cavity center support joiner 124. The length of the two bar extensions 184 can be adjusted as desired. In an example, the two bar extensions 184 can be packaged or shipped with a length that is longer than needed or necessary and can be cut down to size to accommodate or fit a desired cab or pickup truck, such as to fit the width of a cab. The length can be cut so that a gap 278 is provided between two coupling supports 230 located on the two bar extensions 184. When the modular support system 100 of the present embodiment is mounted on a bed of a pickup truck, the vehicle's third brake light 107 (FIG. 1) can be seen or visible through the gap 278 between the two coupling supports 230.

In the present embodiment, each coupling support 230 has an end wall or enclosed surface 232 to define an enclosed coupling support 234, which can be secured to the respective bar extension 184 with a fastener, as previously discussed, or by welding. A center coupling 500 with two extended base members 502 can be provided to support the center support 114, which can have an airfoil cross-section, as previously discussed with reference to FIGS. 2-6, 8, and 9. The two extended base members 502 can be connected to the respective coupling support 230, such as by welding, by using fasteners, or combinations thereof.

The center support 114 can then be attached to the elongated center coupling surface 506, which can be by welding, by using fasteners, or combinations thereof. The elongated center coupling surface 506 can be attached to the two extended base members 502, such as by welding or by fasteners. In some examples, the two extended base members 502 and the elongated center coupling surface 506 are integrally formed. In still other examples, an metal bar, such as a hollow aluminum bar, is bent, pressed, or otherwise cold-worked to form a structure comprising two extended base members 502 and an elongated center coupling surface 506. The pressed or cold-worked element is then attached to the two coupling supports 230.

In an alternative embodiment, the two single cavity coupling supports 230 and the center coupling 500 with the two extended base 502 of FIG. 18 are omitted. Instead, an airfoil cross-section center support 114 as discussed with reference to FIGS. 2-6, 8 and 9 may be used along with two coupling supports 230 each with double cavities 180a, 180b, similar to that shown in FIG. 2. Each bar extension 184 as shown can project through the lower cavity 180b of the respective coupling support 230 and the airfoil cross-section center support 114 can project through the two upper cavities 180a of the two coupling supports 230. Using two double-cavity coupling supports 230 allow more adjustability. Any open end of any of the brackets or extruded members may be enclosed by a cap, which can be secured using detents, fasteners, welding, adhesive, or combinations thereof.

In some embodiments, the two extended base members 502 can be formed with or joined to the two respective coupling support 230 without the elongated center coupling surface 506. In other words, the center support 114 can attach directly to the two extended base members 502 without the elongated center coupling surface 506, similar to that shown in FIGS. 2-6. In an example, the center support 114 is positioned over the two extended base members 502 and then secured thereto by welding and/or by using fasteners. The length of the center support 114 can extend only part of the width of the modular support system 100 as shown or can extend the full width of the modular support system 100. In some examples, the length of the center support 114 can extend longer than the width of the modular support system 100. Any number of accessories, such as light housings or light elements, can be connected to the center support 114, the bar extensions 184, or both, as similarly described elsewhere herein.

A mesh screen or barrier 520 can be provided with the present modular support system 100. The screen or barrier 520 can be made from perforated metal, expanded metal, wire mesh, or metal grating, which has a plurality of through holes 524 for a visual line of sight and a protective frame 528 to protect the rear cab window of a pickup truck from direct impact. In an example, the barrier 520 can be provided with or formed from two or more individual screen or barrier sections 534, 536. As shown, the barrier 520 is formed from three separate screen or barrier sections 534, 536, which can include two end screen or barrier sections 534 and a center screen or barrier section 536. In other examples, the barrier 520 can be formed from two end screen or barrier sections 534 only, or from a single perforated metal, expanded metal, wire mesh, or metal grating that is cut to size to fit within the space defined by the module support system between the two side supports 112, 242 and the center support 114 and the upper edge of the pickup bed. As shown, each side barrier section 534 can have a slanted or angle outer edge and a generally straight or square inner edge, which can be generally straight or square relative to a horizontal line. The center barrier section 536 can have a generally square shape or a rectangular shape.

By forming the barrier 520 with two or more barrier sections 534, 536, the overall size of the barrier 520 can be adjusted. For example, the two side barrier sections 534 can be sized and shaped for use with a majority of cabs and can be provided with a gap between the two inner straight or square edges. A center barrier section 536 can be selected to cover the gap between the two side barrier sections 534 of the two side barrier sections 534. In an example, the center barrier section 536 can have a height that is about the same as that of the two side barrier sections 534 but a width that is wider than the gap between the two side barrier sections 534. Thus, part of the width of the center barrier section 536 overlaps with the two side barrier sections 534. The amount of overlapping can be used to adjust for the overall width of the final barrier 520, which can depend on the width of a pickup cab or the width of a pickup bed.

In an example, the center barrier section 536 can be used to adjust for most if not all of the widths of the various commercially available pickup truck cabs or pickup truck beds. The two side barrier sections 534 can be attached to the frame of the modular support system 100 with brackets 540, slotted bolt holes 544 for adjustability, and fasteners attached to the bolt galleys or T-slots 212 on the two side supports and the center support or bar extensions of the modular support system. The center barrier section 536 can be connected to the two side support sections 534 using fasteners slotted bolt holes 544 for adjustability. The modular system of FIG. 18 can be packaged and shipped as shown and described with reference to FIG. 17 and can further be packaged and shipped with a barrier 520.

Methods of making and using the modular support systems and components thereof as described herein are within the scope of the present disclosure. The methods can comprise a method of packaging and shipping packaged boxes having components of the present modular systems located therein.

Although limited embodiments of modular support systems, assemblies, and components thereof have been specifically described and illustrated herein, many modifications and variations will be apparent to those skilled in the art. For example, the various support devices may incorporate custom paint, have different outer contoured shapes, provided with metallic overcoats, have multiple finishes including anodizing and powder coating and wet paint, etc. Furthermore, it is understood and contemplated that features specifically discussed for one support device embodiment may be adopted for inclusion with another support device embodiment, provided the functions are compatible. Accordingly, it is to be understood that the support devices and assemblies and their components constructed according to principles of the disclosed device, system, and method may be embodied other than as specifically described herein. The disclosure is also defined in the following claims.

What is claimed is:

1. A method of packaging components of a modular system for vehicles, said components and said method comprising:
   placing said components into one or more packaging boxes, said components comprising at least one of a center support having a non-circular cross-section, a bar extension, a coupling support having a top internal cavity for the center support and a lower internal cavity for the bar extension that are separated by an internal baffle, and a base support, and wherein at least two of the components are detached from one another and at least two of the components are provided each with a respective first length that can be trimmed or cut down to a shorter second length before the components are assembled onto a pickup bed.

2. The method of claim 1, further comprising packaging a barrier into the one or more packaging boxes.

3. The method of claim 2, wherein the barrier comprises two or more barrier sections.

4. The method of claim 1, wherein the center support has an airfoil cross-section.

5. The method of claim 4, wherein the airfoil has an angle relative to a lengthwise axis defined by the bar extension that is fixed or adjustable.

6. The method of claim 1, further comprising packaging a gusset plate into the one or more packaging boxes.

7. A method of packaging components of a modular system for vehicles, said components and said method comprising:
   placing a first set of components into one or more packaging boxes, said first set of components comprising a first side support comprising a vertical portion, a lower base portion extending from the vertical portion, and a joiner comprising an internal cavity having a non-circular shape along an end cross-section;
   placing a second set of components into the one or more packaging boxes, said second set of components comprising a second side support comprising a vertical portion, a lower base portion extending from the vertical portion, and a joiner comprising an internal cavity having a non-circular shape along an end cross-section;
   placing a first and a second bar extension into the one or more packaging boxes, said first and second bar extensions each having a first free end and a second free end, wherein the first free end of the first bar extension is configured to couple to the joiner of the first side support and the first free end of the second bar extension is configured to couple to the joiner of the second side support, and a gap is provided between the second free end of the first bar extension and the second free end of the second bar extension;
   placing at least two base supports into the one or more packaging boxes, the at least two base supports comprising a first base support and a second base support, wherein the first base support is configured to align with the lower base portion of the first side support and the second base support is configured to align with the lower base portion of the second side support;
   wherein at least one of the components is provided with a first length that is shorten-able to a second length prior to completing assembly of the modular system to a pickup truck bed; and
   wherein the center support is configured to be located above and between the first and the second bar extensions when the modular system is assembled to a pickup truck bed.

8. The method of claim 7, further comprising packaging a barrier into the one or more packaging boxes.

9. The method of claim 8, wherein a width of the barrier is adjustable.

10. The method of claim 7, further comprising packaging at least two attachment inserts into the one or more packaging boxes, each of said at least two attachment inserts being sized and shaped for coupling into stake bed pockets of a pickup truck bed.

11. The method of claim 7, further comprising a first coupling support and a second coupling support located in the one or more packaging boxes, said center support is configured to attach to the first and second coupling supports.

12. The method of claim 7, further comprising packaging a gusset plate into the one or more packaging boxes.

13. A method of assembling packaged components of a modular system for vehicles, said components and said method comprising:
- removing a first set of components from one or more packaging boxes, said first set of components comprising a first side support comprising a vertical portion, a lower base portion extending from the vertical portion, and a joiner;
- removing a second set of components from the one or more packaging boxes, said second set of components comprising a second side support comprising a vertical portion, a lower base portion extending from the vertical portion, and a joiner;
- removing a first base support and a second base support from the one or more packaging boxes;
- shortening the first base support from a first length to a shorter second length;
- shortening the second base support from a first length to a shorter second length;
- removing a first bar extension from the one or more packaging boxes, said first bar extension having a first free end and a second free end;
- projecting the first free end of the first bar extension into the internal cavity of the joiner of the first side support;
- removing a second bar extension from the one or more packaging boxes, said second bar extension having a first free end and a second free end;
- projecting the first free end of the second bar extension into the internal cavity of joiner of the second side support;
- removing a center support from the one or more packaging boxes and coupling the center support to the first and second bar extensions;
- adjusting a pitch angle of the center support; and
- wherein each of the two joiners comprises an internal cavity having a non-circular shape along an end cross-section.

14. The method of claim 13, further comprising removing a barrier from the one or more packaging boxes.

15. The method of claim 14, wherein the barrier comprises two or more barrier sections that are movable relative to one another.

16. The method of claim 13, further comprising assembling a gusset plate to the first side support.

17. The method of claim 13, wherein the center support is attached to a first coupling support and a second coupling support and wherein the first bar extension is coupled to the first coupling support and the second bar extension is coupled to the second coupling support.

* * * * *